(12) United States Patent
Constantinou et al.

(10) Patent No.: US 9,311,548 B2
(45) Date of Patent: Apr. 12, 2016

(54) RECOGNIZING AND PROCESSING OBJECT AND ACTION TAGS FROM STICKERS

(71) Applicant: Evernote Corporation, Redwood City, CA (US)

(72) Inventors: Phil Constantinou, San Francisco, CA (US); Chris Dahl, Wellesley, MA (US); John W. Hoye, San Jose, CA (US); Jamie Hull, Sunnyvale, CA (US); Gabriel Campodonico, Oakland, CA (US); Stephen James White, San Francisco, CA (US); Alexander Pashintsev, Cupertino, CA (US)

(73) Assignee: Evernote Corporation, Redwood City, CA (US)

( * ) Notice: Subject to any disclaimer, the term of this patent is extended or adjusted under 35 U.S.C. 154(b) by 168 days.

(21) Appl. No.: 13/958,054

(22) Filed: Aug. 2, 2013

(65) Prior Publication Data
US 2014/0050409 A1 Feb. 20, 2014

Related U.S. Application Data

(60) Provisional application No. 61/684,405, filed on Aug. 17, 2012, provisional application No. 61/692,588, filed on Aug. 23, 2012, provisional application No. 61/714,457, filed on Oct. 16, 2012.

(51) Int. Cl.
| | |
|---|---|
| *G06K 9/00* | (2006.01) |
| *G06K 9/20* | (2006.01) |
| *G06K 9/32* | (2006.01) |
| *G06K 9/22* | (2006.01) |
| *G06T 7/00* | (2006.01) |
| *G06F 17/30* | (2006.01) |
| *G06K 9/62* | (2006.01) |
| *G06K 9/36* | (2006.01) |

(52) U.S. Cl.
CPC .......... *G06K 9/2063* (2013.01); *G06K 9/00523* (2013.01); *G06K 9/2054* (2013.01); *G06K 9/228* (2013.01); *G06K 9/3216* (2013.01); *G06K 9/6202* (2013.01); *G06T 7/0044* (2013.01); *G06F 17/30256* (2013.01); *G06K 2009/226* (2013.01); *G06K 2009/363* (2013.01); *G06K 2209/01* (2013.01)

(58) Field of Classification Search
None
See application file for complete search history.

(56) References Cited

U.S. PATENT DOCUMENTS

| | | | | |
|---|---|---|---|---|
| 5,499,108 | A * | 3/1996 | Cotte et al. | 358/400 |
| 6,082,619 | A * | 7/2000 | Ma et al. | 235/462.1 |
| 6,345,304 | B1 * | 2/2002 | Dymetman et al. | 709/238 |
| 6,585,163 | B1 * | 7/2003 | Meunier et al. | 235/487 |
| 7,437,003 | B1 | 10/2008 | Gorbatov et al. | |
| 7,969,440 | B1 | 6/2011 | Polyakov et al. | |

(Continued)

*Primary Examiner* — Kim Vu
*Assistant Examiner* — Nathan Bloom
(74) *Attorney, Agent, or Firm* — Muirhead and Saturnelli, LLC

(57) ABSTRACT

Handling data for a photographic image, includes detecting a reference pattern in the data, detecting at least one sticker in the data, determining an action associated with the at least one sticker, and performing the action on the data. The reference pattern may be a uniform grid pattern of dots preprinted on paper. A paper type may be determined according to the reference image. Determining an action associated with the at least one sticker may depend, at least in part, on the paper type. Detecting a particular one of the stickers may cause data for the photographic image to be stored in a particular location. Detecting a particular one of the stickers may cause data for the photographic images to be assigned particular tags used for organizing and searching.

17 Claims, 19 Drawing Sheets

(56) References Cited

U.S. PATENT DOCUMENTS

| | | | |
|---|---|---|---|
| 8,014,630 B1 | 9/2011 | Polyakov et al. | |
| 2003/0185448 A1* | 10/2003 | Seeger | G06K 9/2054 382/229 |
| 2006/0239525 A1* | 10/2006 | Katayama | G06T 7/0044 382/128 |
| 2006/0294450 A1* | 12/2006 | Barrus et al. | 715/500 |
| 2007/0084916 A1* | 4/2007 | Silverbrook et al. | 235/383 |
| 2007/0171288 A1* | 7/2007 | Inoue | G06T 1/0064 348/241 |
| 2008/0065263 A1* | 3/2008 | Sugawara | B02C 18/0007 700/215 |
| 2008/0148970 A1* | 6/2008 | Chen | G06Q 10/10 101/212 |
| 2008/0187249 A1* | 8/2008 | Konishi | G06K 9/2054 382/306 |
| 2009/0284806 A1* | 11/2009 | Takata | 358/453 |
| 2010/0072274 A1* | 3/2010 | Lapstun et al. | 235/375 |
| 2010/0309527 A1* | 12/2010 | Mandalapu et al. | 358/402 |
| 2012/0114193 A1* | 5/2012 | Bladel et al. | 382/115 |
| 2013/0044954 A1* | 2/2013 | Ashbrook | G06F 21/36 382/187 |
| 2013/0201098 A1* | 8/2013 | Schilit | H04L 12/282 345/156 |
| 2014/0050396 A1 | 2/2014 | Libin et al. | |
| 2014/0050398 A1 | 2/2014 | Pashintsev et al. | |

\* cited by examiner

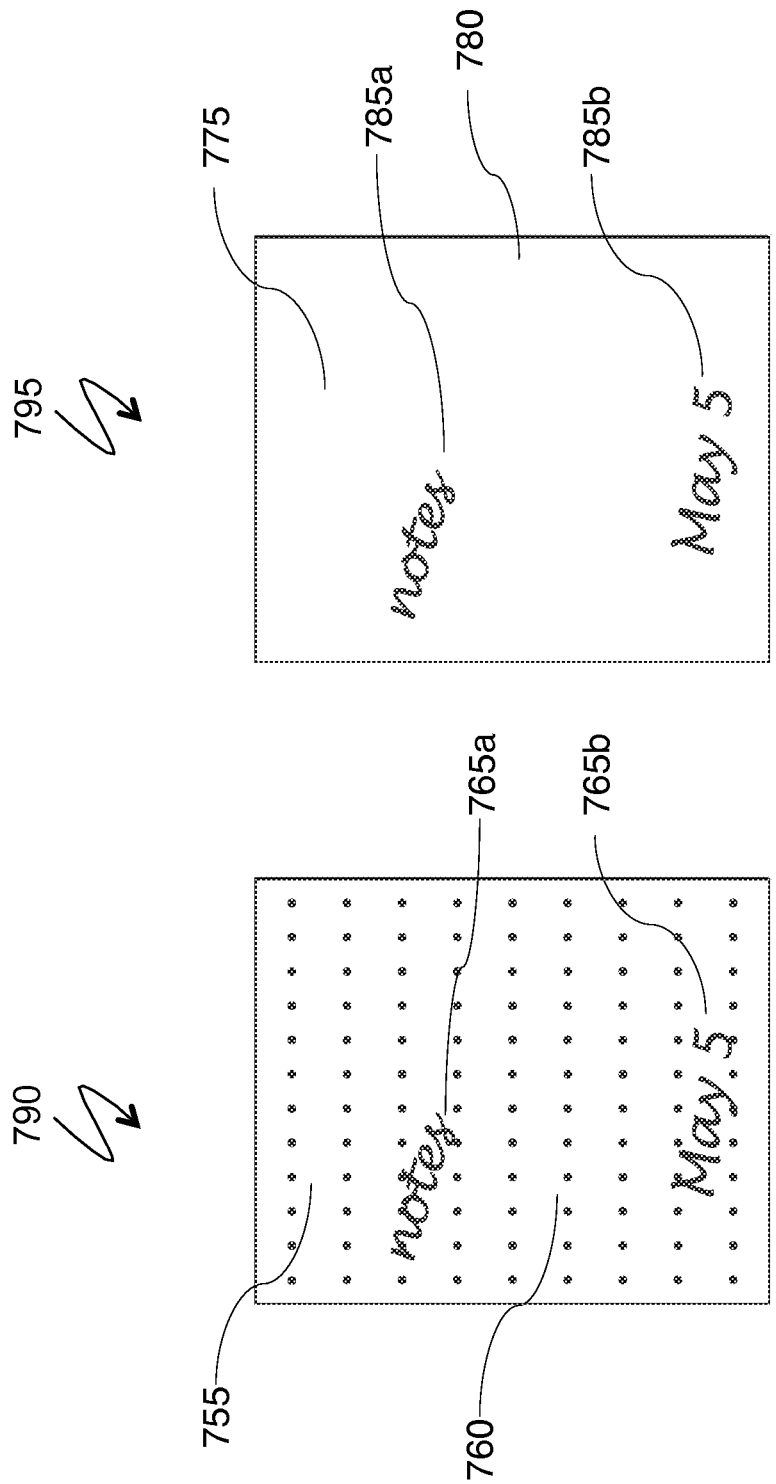

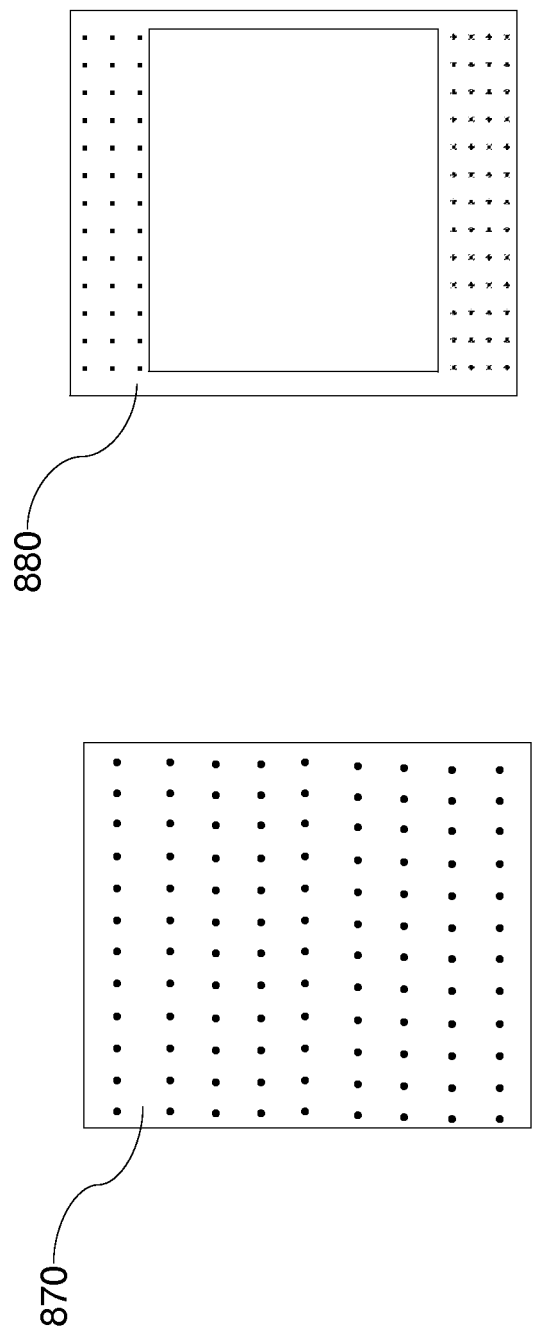

RECOGNIZING AND PROCESSING OBJECT AND ACTION TAGS FROM STICKERS

CROSS-REFERENCE TO RELATED APPLICATIONS

This application claims priority to U.S. Prov. App. No. 61/684,405, filed on Aug. 17, 2012, and entitled "CORRECTION OF PHOTOGRAPHED DOCUMENTS USING SIMPLE PRINTED PATTERNS", which is incorporated herein by reference, and claims priority to U.S. Prov. App. 61/692,588, filed on Aug. 23, 2012 and entitled "RECOGNIZING AND PROCESSING OBJECT AND ACTION TAGS FROM COLOR STICKERS", which is incorporated herein by reference, and claims priority to U.S. Prov. App. No. 61/714,457, filed on Oct. 16, 2012 and entitled "USING SURFACES WITH PRINTED PATTERNS FOR IDENTIFICATION OF IMAGING AND DATA PROCESSING ACTIVITIES", which is incorporated herein by reference.

TECHNICAL FIELD

This application is directed to the field of analyzing, managing and presenting information, particularly in connection with image processing and pattern recognition.

BACKGROUND OF THE INVENTION

In 2012, the number of connected mobile devices in use, including mobile phones and tablets, exceed the population of our planet. Market forecasts indicate that by 2016 there will be over ten billion of Internet-connected mobile devices in the hands of end users, of which approximately eight billion will be smartphones and tablets. Accordingly, digital lifestyles of billions of people will become increasingly dependent on their use of smartphone and tablet applications.

One of the largest smartphone application categories is related to use of phone cameras. According to industry statistics, over 83% of the 1.78 billion mobile phones shipped in 2012 and nearly all smartphones have a camera. Current smartphones have relatively good quality cameras, stimulating quick growth of scanning applications. Scanning applications on smartphones are already used by hundreds of millions people worldwide. Two categories of smartphone scanning activities include taking, storing and processing photographs of paper documents and scanning printed or otherwise displayed matrix (two-dimensional) barcodes for mobile tagging. According to recent market surveys, a smartphone or tablet camera for document capture, and cloud file services, are used by more smartphone and tablet users than mobile scanners, and mobile printing services. Additionally, a December, 2011 survey indicated that approximately 33% of smartphone owners in Japan, 20% of US smartphone users and 14% of smartphone users in EUS, the five most populated European countries, have scanned QR codes, which is only one (albeit the most popular flavor) of the over 70 types of currently existing matrix barcodes.

Online services and multi-platform software such as the Evernote service and platform by Evernote Corporation of Redwood City, Calif., ABBYY by ABBYY Group of Companies, the Dropbox service by Dropbox, Inc. and many other solutions offer image storing, advanced processing and search within images of photographed documents. In particular, the Evernote Service offers indexing and search of handwritten documents, which makes smartphone document scanning an attractive and potentially ubiquitous method of the paperless life. As to barcode scanning, recent surveys revealed that over 75% of US retailers are offering matrix barcodes to their customers. In addition to the three most popular applications of mobile tagging, namely, obtaining product information (most popular in US and Europe), receiving discount offers for goods of services (a dominant QR code application in Japan) and getting event details, there are numerous casual, educational and other uses of matrix barcodes, such as museum guides, searching for lost things, gaming, dating and many other uses.

Notwithstanding significant advances in smartphone camera quality and processing power of mobile devices, capabilities and scope of online services, and their extended document and image processing features, smartphone scanning still faces significant challenges for both categories of document and barcode scanning. In some cases, obtaining quality images of handwritten pages from a camera phone and other photos is a difficult task. Photographs of handwritten pages are subject to variable lighting conditions, perspective distortion, background effects, bending toward notebook edges, etc. Techniques for correcting real-life photo images with shadows, reflections and distortions; identifying page boundaries; separating handwriting from paper background; correcting perspective distortions and curved edges, and other similar tasks have been explored by many vendors with varying degrees of success. In particular, the tasks of unique identification of a page of a notebook, and reconstructing page boundaries have been traditionally solved by adding barcodes or cropping marks, such as a page frame, corner markers and other distinguishing and location-bound page elements. Such approaches make page identification results vulnerable to occasional reflections and shadows, interference with unrelated objects that may shield portions of photographed pages, etc. In some cases, note-takers' instructions for note filing and note related actions at the time of writing are different for different pages of handwritten documents. Examples may include tagging, merging handwritten pages, communicating portions of note content to different people, etc. These actions may be reoccurring from note to note and may be easily forgotten if not memorized instantly. However, existing paper based note-taking systems lack simple, easily recognizable and convenient means of indicating actions that can be instantly converted into the digital form identifiable on smartphone photographs of notebook pages.

Analogously, the usage of QR codes and other rasterized identifiers is not without problems. One disadvantage of such marks lays in their conflict with the aesthetics of product design. For example, an image of a QR code with a mediocre information capacity of 98 characters has a minimal linear size of 48 mm (1.9") for reliable scanning from a comfortable distance of 300 mm (12") that would secure a subsequent accurate decoding by the smartphone software. For many small-size goods carrying aesthetical functions, the presence of a relatively large black-and-white square patch might be a considerable design problem. For example, an online marketing guide to QR codes repeatedly warns against an inappropriate use of QR codes on promotional items: "Putting the code on the front makes the t-shirt unattractive . . . . "

Another potential issue with processing matrix barcodes is that, in spite of generally reliable error correction codes incorporated into such identifiers, their recognition completely depends on the location of characteristic elements within the codes, such as the bullseye cropping marks at the angles of a QR code or the black L-shaped finder pattern border and the alternate timing pattern border in a Data Matrix barcode. In a non-commercial photographing environment, these elements may be easily obstructed and may be quite sensitive to lighting conditions, which creates an increased risk of losing the recognizable codes which are present on the photo but remain unidentified by the software. It also takes time for a user to locate and target matrix barcodes with a phone camera, which doesn't align well with other photographing activities where the aesthetical aspect is important and where image processing tasks are involved.

Accordingly, it is desirable to design streamlined methods for automatic identification of photographed objects, including correction methods for images of paper pages with handwriting, and for performing image and data processing tasks that combine reliable recognition and identification with aesthetical attractiveness of photographed scenes.

SUMMARY OF THE INVENTION

According to the system described herein, adjusting data for photographed images includes detecting a reference image in the data, where the reference image contains a detectable uniformity and adjusting the data according to the reference image. The reference image may be a uniform grid pattern of dots preprinted on paper. A paper type may be determined prior to adjusting the data according to the reference image. The paper type may be determined according to spacing and/or patterns of the dots, and/or layout of page areas covered with dots. Adjusting the data may include removing effects corresponding to a folded corner, a removed corner, an obstructed corner, lens flare spots, and/or a shadow. Positional coordinates of the data may be adjusted by normalizing the grid through a non-linear transformation that eliminates curvature of the grid and/or distortions based on perspective. Adjusting the data may include detecting page boundaries. The photographed image may be handwritten notes on the preprinted paper that are photographed using a mobile phone. Color and brightness correction may be performed by comparing color and brightness of the paper and dots with ideal brightness values for the paper and dots. Ideal brightness of the ink may be determined through calculations based on brightness values of the paper and the dots for the particular paper type. Adjusting data for photographed images may also include removing the grid pattern in connection with adjusting the data. The reference image may be a background pattern provided on an item. The disposition of the background pattern may facilitate detecting orientation of the item. The reference image may have a pre-defined color that is used for color correction. The reference image may be an image of a tray. The tray may be oval or rectangular and may include dividers. Detecting a reference image may include a reverse image search and content-based image retrieval techniques. A content-based image retrieval technique may be selected from the group consisting of: TinEye, Imprezzeo, and Macroglossa.

According further to the system described herein, computer software, provided in a non-transitory computer-readable medium, adjusts data for photographed images. The software includes executable code that detects a reference image in the data, where the reference image contains a detectable uniformity and executable code that adjusts the data according to the reference image. The reference image may be a uniform grid pattern of dots preprinted on paper. A paper type may be determined prior to adjusting the data according to the reference image. The paper type may be determined according to spacing and/or patterns of the dots, and/or layout of page areas covered with dots. Adjusting the data may include removing effects corresponding to a folded corner, a removed corner, an obstructed corner, lens flare spots, and/or a shadow. Positional coordinates of the data may be adjusted by normalizing the grid through a non-linear transformation that eliminates curvature of the grid and/or distortions based on perspective. Adjusting the data may include detecting page boundaries. The photographed image may be handwritten notes on the preprinted paper that are photographed using a mobile phone. Color and brightness correction may be performed by comparing color and brightness of the paper and dots with ideal brightness values for the paper and dots. Ideal brightness of the ink may be determined through calculations based on brightness values of the paper and the dots for the particular paper type. The software may also include executable code that removes the grid pattern in connection with adjusting the data. The reference image may be a background pattern provided on an item. The disposition of the background pattern may facilitate detecting orientation of the item. The reference image may have a pre-defined color that is used for color correction. The reference image may be an image of a tray. The tray may be oval or rectangular and may include dividers. Detecting a reference image may include a reverse image search and content-based image retrieval techniques. A content-based image retrieval technique may be selected from the group consisting of: TinEye, Imprezzeo, and Macroglossa. The software may be pre-loaded with a device, installed from an app store, or downloaded from a location of a network operator.

According further to the system described herein, handling data for a photographic image, includes detecting a reference pattern in the data, detecting at least one sticker in the data, determining an action associated with the at least one sticker, and performing the action on the data. The reference pattern may be a uniform grid pattern of dots preprinted on paper. A paper type may be determined according to the reference image. Determining an action associated with the at least one sticker may depend, at least in part, on the paper type. Detecting a particular one of the stickers may cause data for the photographic image to be stored in a particular location. Detecting a particular one of the stickers may cause data for the photographic images to be assigned particular tags used for organizing and searching. A particular one of the stickers may represent a custom tag that is assigned after data for the photographic image is stored. Detecting a particular one of the stickers may cause handwritten text corresponding to the sticker to be used for a title of a note corresponding to the data for the photographic image. A user may apply the at least one sticker.

According further to the system described herein, computer software, provided in a non-transitory computer-readable medium, handles data for a photographic image. The software includes executable code that detects a reference pattern in the data, executable code that detects at least one sticker in the data, executable code that determines an action associated with the at least one sticker, and executable code that performs the action on the data. The reference pattern may be a uniform grid pattern of dots preprinted on paper. A paper type may be determined according to the reference image. Determining an action associated with the at least one sticker may depend, at least in part, on the paper type. Detecting a particular one of the stickers may cause data for the photographic image to be stored in a particular location. Detecting a particular one of the stickers may cause data for the photographic images to be assigned particular tags used for organizing and searching. A particular one of the stickers may represent a custom tag that is assigned after data for the photographic image is stored. Detecting a particular one of the stickers may cause handwritten text corresponding to the sticker to be used for a title of a note corresponding to the data for the photographic image. A user may apply the at least one sticker. The software may be pre-loaded with a device, installed from an app store, or downloaded from a location of a network operator.

According further to the system described herein, identifying at least one object in data for photographed images includes detecting a reference pattern in the data, locating the reference pattern in a table of patterns, and identifying the at least one object according to the reference pattern. The pattern may be located on the at least one object. The at least one object may be a greeting card. The pattern may categorize the greeting card by season and/or occasion. The pattern may identify a sender of the greeting card. The pattern may be provided on an item that is separate from the at least one object. The table of patterns may include a record for at least some of the patterns and the record may include additional information associated with the pattern. The additional information may include tasks that are performed in connection with the pattern. The additional information may include geometric and color parameters of the pattern. The data may correspond to a business card and a business card holder. Tasks associated with business cards may include tasks for correcting orientation of the business card, tasks for performing OCR on the business card to determine a name and contact information, and tasks for storing the name and contact information. A task may cause the data to be tagged and/or filed according to the reference pattern.

According further to the system described herein, computer software, provided in a non-transitory computer-readable medium, identifies at least one object in data for photographed images. The software includes executable code that detects a reference pattern in the data, executable code that locates the reference pattern in a table of patterns, and executable code that identifies the at least one object according to the reference pattern. The pattern may be located on the at least one object. The at least one object may be a greeting card. The pattern may categorize the greeting card by season and/or occasion. The pattern may identify a sender of the greeting card. The pattern may be provided on an item that is separate from the at least one object. The table of patterns may include a record for at least some of the patterns and the record may include additional information associated with the pattern. The additional information may include tasks that are performed in connection with the pattern. The additional information may include geometric and color parameters of the pattern. The data may correspond to a business card and a business card holder. Tasks associated with business cards may include tasks for correcting orientation of the business card, tasks for performing OCR on the business card to determine a name and contact information, and tasks for storing the name and contact information. A task may cause the data to be tagged and/or filed according to the reference pattern. The software may be pre-loaded with a device, installed from an app store, or downloaded from a location of a network operator.

Decorative patterns pre-printed on surfaces (referred hereinafter as smart fabrics, smart surfaces and smart patterns) encode designation of the surfaces, associated image processing tasks, filing instructions and other activities via geometry of the patterns, color palette of the patterns or a combination thereof. Certain parameters of smart patterns, such as a known color palette or a count of elements within a smart surface area may also be used to facilitate or enable efficient processing.

When a scene with full or partial view of smart fabrics is photographed using a dedicated mobile software application on a smartphone, such as the Evernote Page Camera feature, the application analyzes the smart pattern, looks up for the corresponding record, retrieves the associated image processing tasks and parameters, and performs the tasks, which may include color correction facilitated by the known color palette of the smart fabrics, eliminating shadows, glare and other lighting effects, geometrical correction, including perspective correction, straightening images of curved objects, eliminating backgrounds for more reliable OCR and handwriting recognition, etc.

A smart surface may have a periodic design represented by a tessellation (tiling) where one or several proto tiles (i.e. basic tiles of different shapes) may be combined into one periodic smart pattern. Encoding of image designation, associated tasks and other necessary data may be achieved through graphical elements repeated on individual tiles and/or through tile shapes and relative disposition of the tile shapes, i.e. the ornamental characteristics. The first approach where graphical elements on individual tiles encode necessary data may be more applicable to smart surfaces with sufficiently large tiles where the graphics of individual tiles is recognizable on photographs. In the latter case, encoding may be defined by the combinatorial properties of symmetric or asymmetric tiling (for example, different domino or tatami tiling).

Color treatment on a smart surface may serve different purposes: for one class of smart surfaces, color combinations may be used as additional encoding and identification parameters, for example as found on Wang dominoes; for other classes of smart surfaces, color palette may be uniquely or in a distinguishable way defined by the geometry and used for image processing tasks, as explained elsewhere herein. For example, smart surfaces with the same geometric ornament may use different colors or color combinations designed in such way that any pair of colors or their combinations can be distinguished from any other pair under a broad range of photographing conditions and camera parameters.

Smart patterns may be stored in a centralized repository, such as a database in the cloud. A designer and/or manufacturer of accessories or other goods with smart surfaces may choose an existing smart pattern, including choosing geometrical ornament and color palette of the pattern, in accordance with design taste and image processing, organizational and other tasks accompanying usage of goods. Alternatively, a smart pattern may be built to an individual order using special authoring software, which subsequently adds a record of the new pattern to the repository, along with image processing tasks, parameters and instructions. In an embodiment, end users may also be able to order smart patterns and even produce customized smart fabrics, such as hand-made greeting cards with pre-printed smart surfaces.

Database records from a repository of smart patterns may be subsequently retrieved by software applications running on smartphones and other mobile devices or on servers of online services; reverse image search or other content-based image retrieval or matching techniques may be employed for finding smart fabrics records.

Users may be aware of the presence and designations of smart surfaces on goods owned by the users. Subsequently, users may consciously include and utilize photographs of scenes with the inclusion of smart fabrics for improving image quality, identifying and organizing photographs and objects on the photographs, increasing pattern recognition accuracy from images, etc. For example, after taking a photo of a scene where a smart surface is visible, a user may implicitly or explicitly notify the software application about the need of additional processing. The software may identify a smart surface (possibly in an interactive mode requesting users to confirm the correctness of its identification), retrieve a record for the corresponding smart pattern from the repository, decode and extract additional information about the smart surface (such as color, dot or other element count, brightness and line parameters of a geometric ornament, etc.), along with a list of tasks for which the pattern was designated, and use such additional information for the corresponding image processing, pattern recognition, information organization and analysis and other tasks.

Several applications of smart fabrics are explained below. Obviously, there may be numerous other applications, image and data processing tasks and system architectures associated with smart patterns, smart surfaces, smart fabrics and related accessories.

1. An owner of a business card holder with a smart surface (an accessory manufactured with a pre-printed smart fabrics cover) takes out a business card and puts it on the holder. Another user takes a photograph of the business card on the holder using a smartphone equipped with the smart pattern processing software. The software may recognize the smart surface, retrieve the smart pattern record from the central repository or a local storage, and decode the associated task(s), parameters and instructions for that particular unit of smart pattern. In this case, the record may describe the photographed object as a business card and identify color parameters and geometry of the smart pattern that served as a background to the photograph. Accordingly, the software may identify and rotate the card as necessary using its orientation with respect to the geometry of the background, perform perspective, color and contrast correction of the card image using the known color parameters and geometry of the smart pattern as the correction basis, and eliminate the smart pattern background, retaining the corrected image of the card for further processing. The software may then eliminate any decoration and background on the card and invoke OCR software for retrieving contact data from the card. In this application of smart surfaces, color and geometry of a smart pattern may be used many times for image processing tasks and for obtaining black-and-white image of the text on the card for improved text retrieval.

2. A greeting card received by a user has a smart surface on the front and/or back sides of the greeting card. A user takes photos of the outside and inside of the received greeting card and runs the photos through the dedicated software. The software may recognize the smart pattern, look up for the appropriate record and instructions, automatically categorize the card by season and occasion (and possibly by sender if the card was custom made by the sender or sender's organization), all of which have been encoded in the smart fabrics database. The software may also file images of the card as a single object under the appropriate tags in a personal database, such as a note in an Evernote notebook and may add an automatically generated title, for example, "Christmas greeting card from Jim".

3. Post-it® Notes by 3M come in a variety of colors; users may color code their activities, projects and memos, so it may be important to reproduce photographed colors of generic or special Post-it notebooks as close as possible. Meanwhile, lighting conditions may lead to confusion of close colors, such as, for example, Apple Blossom and Neon Green or Neon Pink and Wild Cherry. A smart organizer tray with a distinctive shape (possibly including dividers) and color combination may help distinguishing a color of a Post-it notebook placed on such tray much more precisely if the tray is recognized on a photograph as a smart surface. Then true surface color(s)—say, edge, bottom and divider colors—of the organizer are known from the smart pattern record. The software may compare the genuine color palette with the actual colors reproduced on the photograph and use this information for color correction and filtering of the whole scene. In that way, color deviations for the tray colors on the photo may be used to correct the color of a Post-it notebook, since the image of the notebook on the photograph is subjected to a similar color distortion as the tray.

4. Similarly to the previous example, napkins, placemats or table cloth made of smart fabrics may be used at a restaurant dining One of the diners may take a photograph of a served food using a dedicated software application, such as Evernote Food, and may subsequently file the photograph as an image with a smart surface. The software may then locate and identify the smart fabrics on the image, look up in the database for the smart surface parameters, which contain the true color palette of the napkin, and possibly other color correction instructions, and correct colors of the food photo using the same technique as in the previous example.

Paper notepads and notebooks, such as Evernote Smart Notebook by Moleskine, use smart surfaces. Simple and regular pre-printed patterns, such as a dotted grid reproduced on notebook pages, may be used for a variety of image and data processing tasks. Pattern and paper characteristics such as a dot count in each horizontal or a vertical line or in a cell, a distance between lines, a page layout that combines dotted and plain paper areas, a brightness and color characteristics of the paper and the dots may serve both as identifiers of a notebook type and as parameters used for image correction and processing, as explained elsewhere herein. This technique uses redundancy of the pattern and repeatability. A regularity of a grid may compensate for omissions and defects in a photographed image caused by reflections, lens flare, deep shadows, minor shielding by alien objects, occasionally folded corners, perspective distortion, etc. Since grid characteristics on a page may be evenly distributed over the image, rather than localized near paper corners or edges, using a repeating grid may be more robust and resistive to random photographing defects compared to other techniques that imprint significant information into narrow areas of the page.

Decision rules may be used to determine whether a currently analyzed image is in fact a photograph of a paper page with a pre-printed grid produced according to the proposed technique. The rules may be based on the grid and paper parameters explained elsewhere herein and may compare grid element counts and spatial characteristics of grid elements with an ideal page having the same counts with the same characteristics as the current image. The rules may apply to two decision areas:

Rejection of an area when a significant difference between the analyzed and the ideal page with respect to a particular parameter (for example, dot size) cause instant rejection of the image prior to applying any subsequent rules. For example, if the count of reliably identified grid elements on an image is below 50% of a standard count (on an ideal page) or higher than 120% of the standard count, then the image doesn't belong to a page of the ideal type.

Scoring of an area where deviations from the ideal page for different rules are deemed acceptable and are used as scores. For example, if over 80% of identified grid elements on an image can be grouped into a set of approximately parallel lines with the maximum relative deviation of elements from the corresponding lines not exceeding 3% and the difference in line directions does not exceed 5%, then the actual percent of elements grouped into lines is accepted as a score of the parallel lines rule.

Subsequently, rule-by-rule scores may be aggregated into a final score which results in accepting or rejecting page attribution to a certain type based on a threshold or on other aggregated identification metrics.

Once a paper page image has been positively identified, image processing tasks may be accomplished using diverse techniques based on counts and spatial characteristics of grid elements. Thus, a technique of identifying page boundaries may include extrapolating detected gridlines to the known count, uniquely defined by the paper type, in such a way that the deviation between left/right/top/bottom positions of line endings is minimal. Once the gridlines are normalized, preliminary page boundaries may be calculated. Page boundaries may be further adjusted after perspective distortions have been eliminated.

After the preliminary page boundaries have been calculated, correcting perspective distortions or curved edges may use the distribution of distances between adjacent grid elements. Thus, lower average distances between grid elements (an equivalent of a lower length of gridlines, given a constant element count) show an increased distance of a respective portion of a page from the camera due to perspective distortion. A camera view angle may then be estimated and the perspective correction may be performed.

Curved edges may be corrected by a similar technique, modified to estimate a distribution of distances along a single line, rather than adjacent lines; augmented by calculating gridline curvature to directly straightens the dotted arcs, whereas the whole image is transformed accordingly.

The identified dot pattern may improve page binarization, such as separating page background from handwritten strokes and from other objects on the page (for example, smart stickers explained elsewhere herein). One technique for such assisted split of the page content may mark as a background all page areas where only grid elements are present and leave as an added content all blocks of pixels that are crossing the grid (and thus overwrite grid elements). Another technique may use calculated relative brightness of grid elements vs. paper background to augment standard background detection algorithms with a decision rule based on the presence of known brightness ratios between the present grid elements and the rest of the image, in order to reliably identify background areas, as explained in more details elsewhere herein.

For improved handwriting recognition, the grid may be completely deleted from an image; or, the grid may be replaced with an artificial ideal grid for an aesthetical purpose. Parameters of an artificial grid may be recorded within the system, so the grid could be identified and deleted prior to a handwriting recognition step. Deleting the grid reduces a risk of misinterpreting grid elements by a handwriting recognition engine, which may confuse the grid elements with portions of handwriting on a binary black-and-white image containing both the handwriting and the dots.

Minor deviations in the grid pattern periodically repeated across each page of a notebook may encode brief additional information, such as a page number or a unique notebook identifier. Deviations may be represented by omitted or additional grid elements of the same or different shapes, by variation of distances between gridlines, etc. Such encoding may be repeated in the same or alternative form in several different page areas to create a redundancy characteristic of simple printed patterns and to prevent information loss due to unfavorable lighting or other photographing conditions or due to minor unnoticed obstructions of a page.

In addition to pre-printed smart patterns, identifiable stickers of different colors and shapes may be used in conjunction with smart surfaces to enhance and customize usage of smart fabrics. A few examples of such customization and actions associated with color stickers are as follows:

a. Filing actions where a sticker shape/color is associated with a specific digital destination, such as an Evernote notebook or a file folder.

b. Tagging actions where a sticker denotes a tag assigned to a note associated with a photograph; one or multiple tags may be attached to an object. An example of such an object may be a page of notes in a paper notebook with a simple pre-printed pattern, as explained elsewhere herein.

c. Merging actions for a paper notebook with handwritten notes where a sticker instructs on merging a handwritten page with the next page into one and the same note.

d. Splitting actions for a paper notebook with handwritten notes where a sticker located near a portion of text instructs on copying or moving that paragraph or portion of note into a separate note.

e. Title assigning actions for a paper notebook with handwritten notes or other text carrying medium where a sticker placed near a marked up portion of a handwritten or typed text instructs on using that text as a title of an associated note.

f. Communication actions where a sticker causes transmission (for example, emailing) of an object associated with a photograph or a portion of an object to a pre-programmed destination. Optionally, a transmission form may be displayed where the user may assign transmission destinations.

g. To-do actions where a couple stickers of certain type delimit a portion of text that is entered as a task and is supplied with a to-do checkbox.

Actions associated with stickers may be positional (i.e. depend on a sticker location within an object, such as a notebook page with a handwritten note) or position agnostic. The actions may apply to the whole page (for example, filing instructions), to a portion of a page (for instance, title assigning or splitting instructions) or to multiple pages (e.g. merging instructions). The actions may also instruct on single or composite actions; for example, two adjacent stickers may denote extracting a portion of a page (the first sticker) and sending the portion to a certain destination (indicated by the second sticker). The system may display special icons, visually resembling stickers, within a user interface of the software where actions and parameters associated with stickers are customized.

BRIEF DESCRIPTION OF THE DRAWINGS

Embodiments of the system described herein will now be explained in more detail in accordance with the figures of the drawings, which are briefly described as follows.

FIGS. 7A-7C illustrate several phases of correction of a photograph of a paper page with a simple pre-printed pattern originally containing various types of defects and distortions, according to an embodiment of the system described herein.

FIGS. 8A-8F illustrate different parameters of dotted pre-printed patterns on paper pages used to identify a pattern type, according to an embodiment of the system described herein.

DETAILED DESCRIPTION OF VARIOUS EMBODIMENTS

The system described herein provides a mechanism for creating, storing, producing, identifying and utilizing smart patterns, smart surfaces, smart fabrics, smart notebooks with simple pre-printed patterns, and smart stickers. The system provides different techniques for assigning tasks to smart patterns, processing photographs of objects with smart fabrics and performing activities associated with smart stickers.

Figure 1:
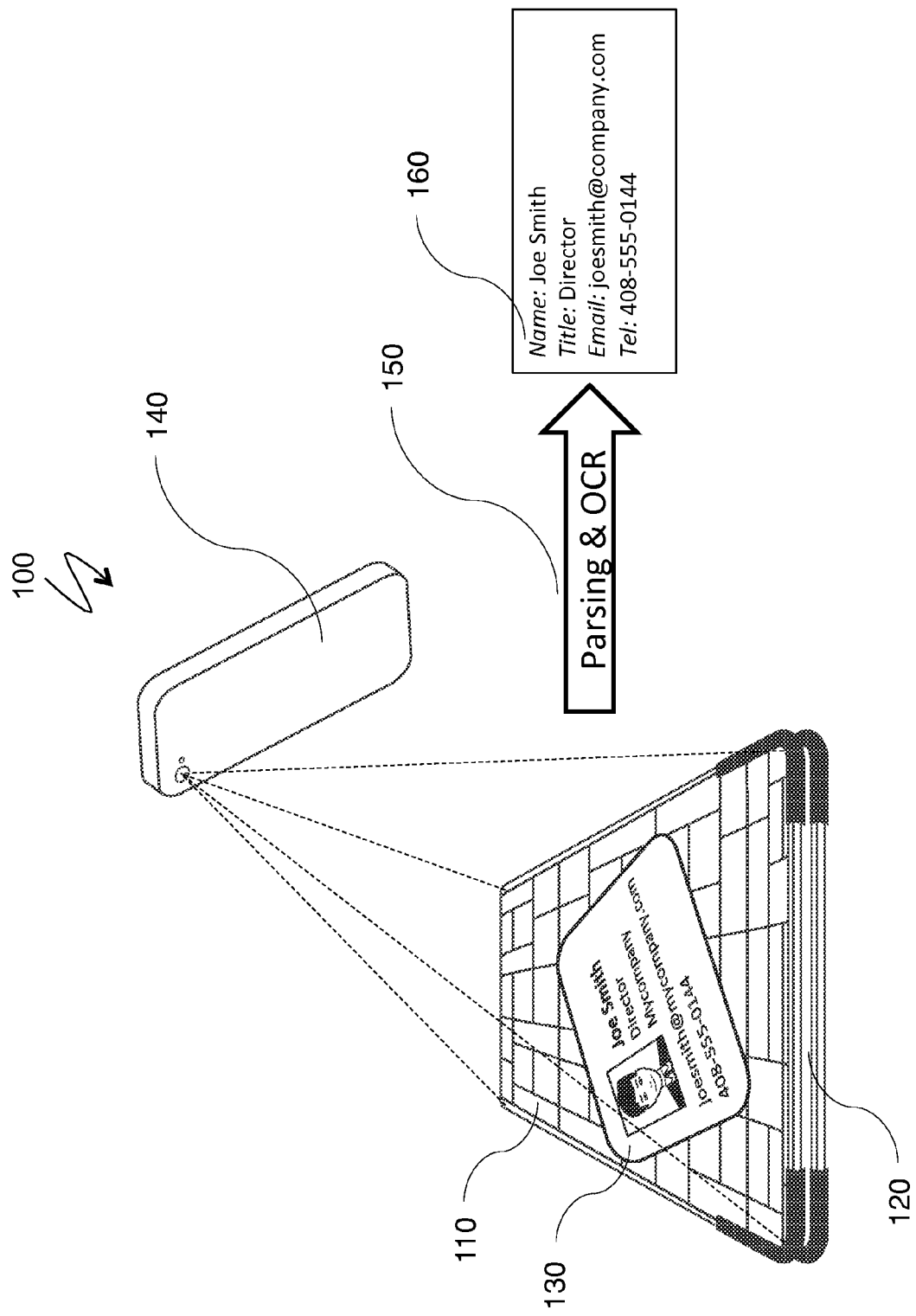
FIG. 1 is a schematic illustration of smart fabrics used in conjunction with a business card holder, according to an embodiment of the system described herein.

FIG. 1 is a schematic illustration 100 of smart fabrics in conjunction with a business card holder and a task of processing photographs of business cards. A smart pattern 110, in this case a domino tiling on a monochromatic or a multicolor background, represents smart fabrics, or a smart surface of a business card holder 120. A business card 130 is placed on a surface of the business card holder 120. Note that the holder 120 and the business card 130 are not necessarily drawn to relative scale in FIG. 1. A user may want to obtain the contact info of the card owner. The user uses a smartphone 140 with the smart pattern processing software application and takes a photo of the business card 130 on top of the holder 120. The software on the smartphone 140 identifies the smart fabrics 110 (pattern on the holder 120), retrieves a record associated with the particular smart fabric of the holder 120, and extracts the information about a corresponding task 150 and additional parameters facilitating the task. In this case, the task 150 associated with the smart pattern is parsing and recognizing printed information on the card 130. The software may use a geometry description of the smart pattern to identify boundaries and rotation angle of the card 130, and perspective correction parameters. The software may also use the colors of the surface and the ornamental characteristics (domino tiling) to perform a color correction of the card 130 and adjust binarization parameters of the card 130. The software may then call embedded or otherwise integrated image recognition software to parse the printed information, locate specific elements, such as a name, title, email, phone number, etc., and transcribe the printed information using OCR methods, thus producing a contact information record 160 that may be stored in a contact database by an appropriate contact management application running on the smartphone 140.

Figure 2:
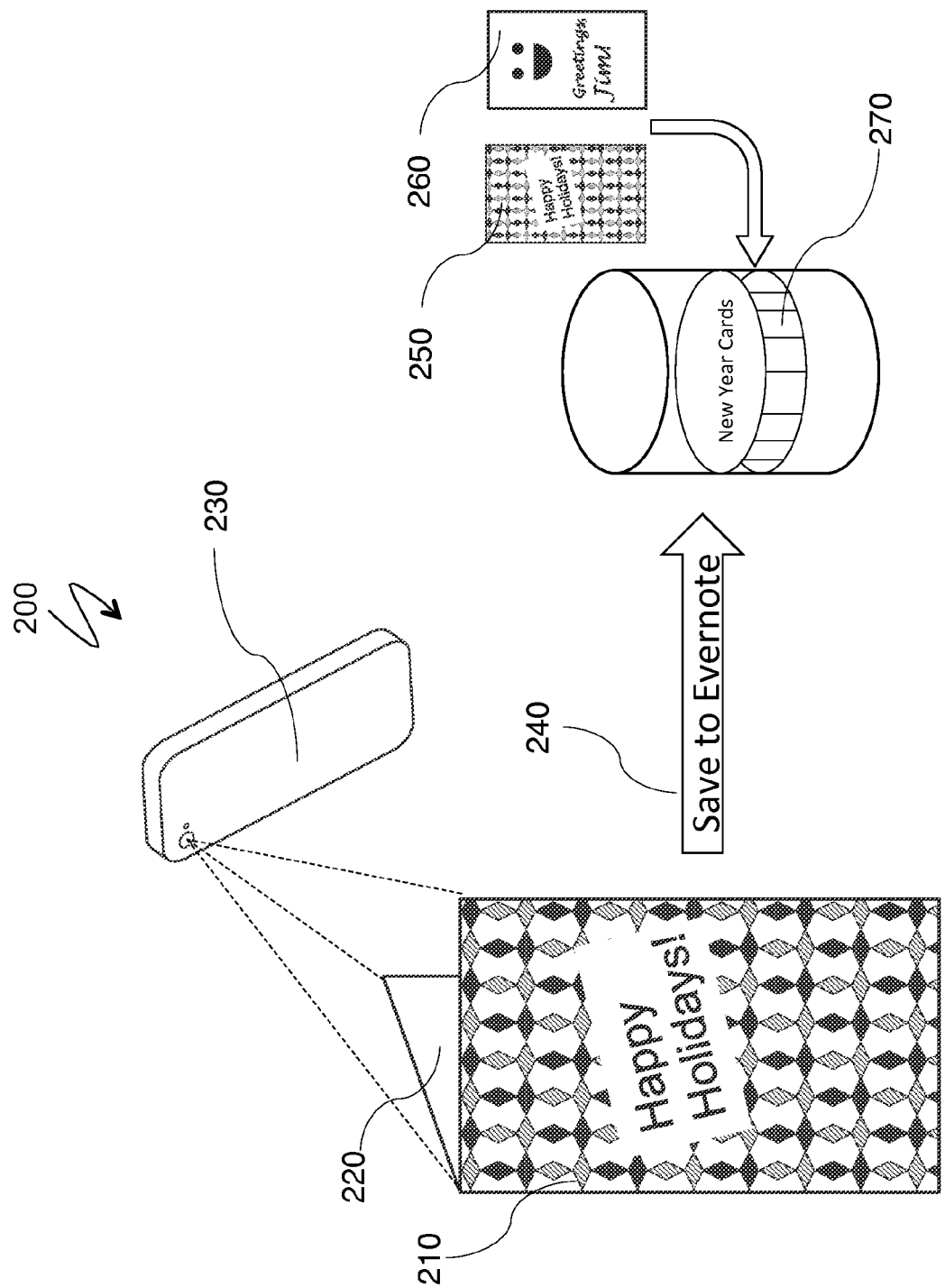
FIG. 2 is a schematic illustration of smart fabrics used in conjunction with identifying, tagging and filing photographs of greeting cards into the Evernote personal content management system, according to an embodiment of the system described herein.

FIG. 2 is a schematic illustration 200 of smart fabrics in conjunction with identifying, tagging and filing photographs of greeting cards into the Evernote personal content management system. A multi-color smart pattern 210 (different colors are illustrated by different filling of diamonds comprising the ornament; additionally, the background shown in white may be any color) is pre-printed on the front and possibly on the back or internal surface(s) of a greeting card 220. A recipient of the card takes a photograph of the card 220 with a smartphone 230 which runs smart pattern processing software. The software identifies the smart pattern, retrieves a record for the smart pattern from a centralized or local repository, and retrieves a task 240 associated with the smart pattern, which in this case is saving the photograph to Evernote. The record may also include an occasion for which the card was sent, such as New Year cards or Birthday cards, as well as filing and tagging instructions. In addition to the photograph 250 of the front side of the card, the software may invite the recipient to take photos of all sides, as schematically shown by an item 260 that has a handwritten greeting by the sender. The images may then be automatically entered into a single greeting card note that may be filed to Evernote in a New Year Cards notebook 270 or with a portion of notes tagged as New Year Cards.

Figure 3:
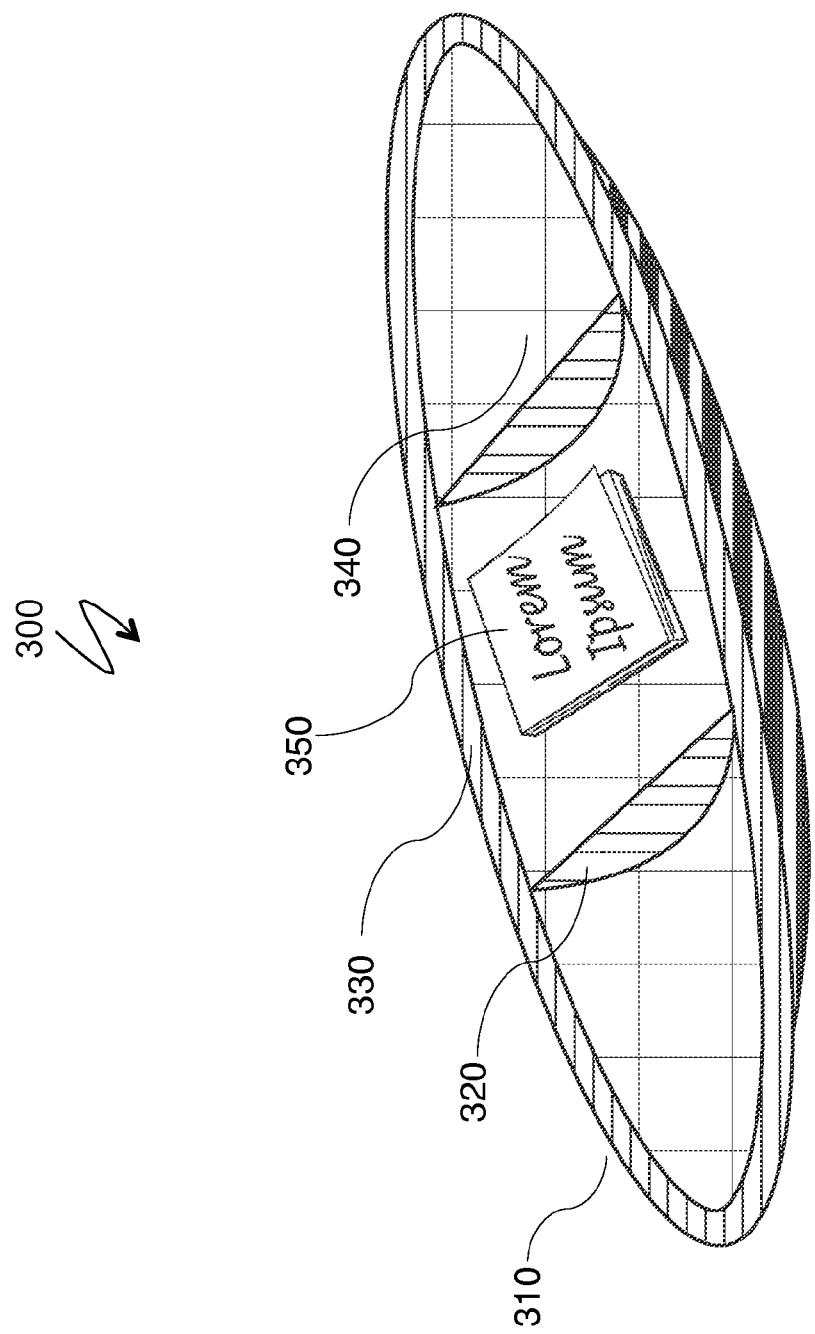
FIG. 3 is a schematic illustration of a desktop organizer tray used for color correction of paper pads, according to an embodiment of the system described herein.

FIG. 3 is a schematic illustration 300 of a desktop organizer used for color correction of paper pads. An oval-shaped tray 310 with dividers 320 may have distinctive and contrasting colors on an edge 330, on an interior part 340 and possibly on the dividers 320, which may be solid colors or may have ornamental patterns for further differentiation of smart surfaces. A paper pad 350, such as a Post-it® notepad, shown on the illustration 300 with a handwritten text, is placed on the tray 310. A photograph of the tray 310 with the pad 350 may be taken. Smart pattern processing software may identify the shape of the tray 310 and colors of surfaces of the tray 310 and, after a confirmation by a user, may retrieve the corresponding record for a smart pattern that contains exact color characteristics of each part of the tray 310. Based on the known color values, the software may perform color correction of the photograph to accurately reproduce the color of the paper pad 350 (shown here in white color) and thus enhance user experiences by offering an adequate image and by eliminating potential errors in following a color coding scheme of a user.

Figure 4:
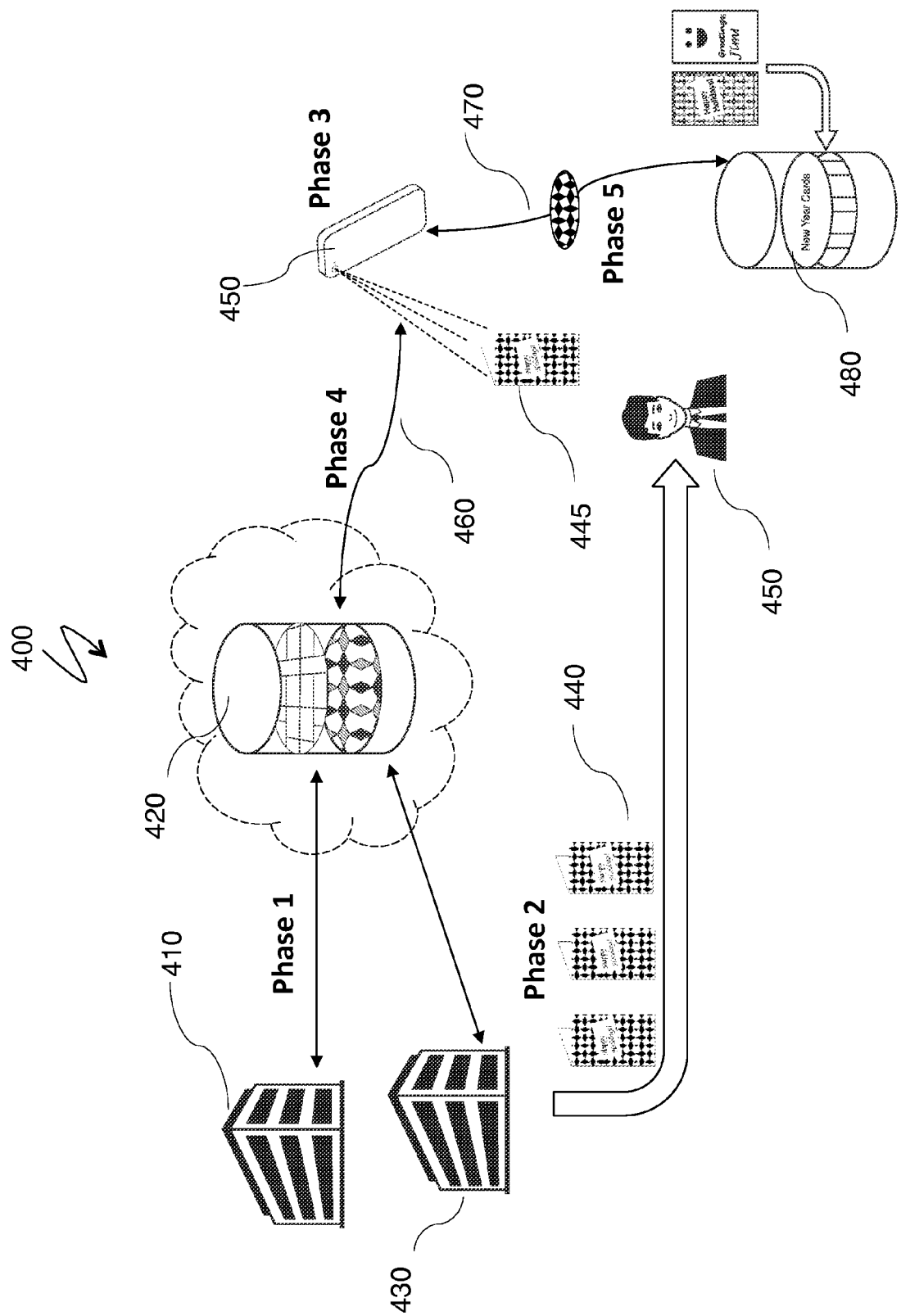
FIG. 4 is a system architecture chart explaining design, production and use of smart patterns and smart fabrics, according to an embodiment of the system described herein.

FIG. 4 is a system architecture chart 400 explaining design, production and use of smart patterns and smart fabrics. At Phase 1, a smart pattern design facility 410 develops smart patterns based on customer orders. Customers may include providers of accessories utilizing smart fabrics and individuals employing smart fabrics for personal use by the individuals, such as personalized greeting cards or other goods. The design facility 410 interacts with a central repository of smart patterns 420, which may be a distributed online database accessible by all facilities. Interacting with the repository 420 secures a uniqueness of each new smart pattern and support registration for new patterns with records containing geometry and color descriptions, associated tasks, parameters and usage instructions. At Phase 2, the smart patterns are sent to a production facility 430 where accessories with smart surfaces 440 may be produced in necessary volumes on customer demand or according to other production plans and schedules and may be delivered to end users 450, possibly through multi-tier distribution and sales channels (not shown on the chart 400). At Phase 3, a user takes a photograph of an accessory 445 with a smart surface using a smartphone 450 running smart pattern processing software. At Phase 4, the software attempts to recognize the smart pattern and looks up for the corresponding record in the repository 420. Note that identifying smart fabrics and recognizing the underlying smart pattern may be a multi-step and interactive procedure by, for example, retrieving multiple candidate smart patterns from a repository, image recognition and search, confirmation and other participation by the user, etc. Various reverse image search and content-based image retrieval techniques may be applied, including such engines as TinEye, Imprezzeo, Macroglossa, etc., along with analytic descriptions and encoding of smart patterns and related search in descriptor codes. At Phase 5, the software decodes the record and performs associated tasks, as illustrated by a connector 470 and by filing photographs of the accessory into an Evernote notebook 480 named New Year Cards (or under a tag New Year Cards), as explained in more details elsewhere herein.

Figure 5:
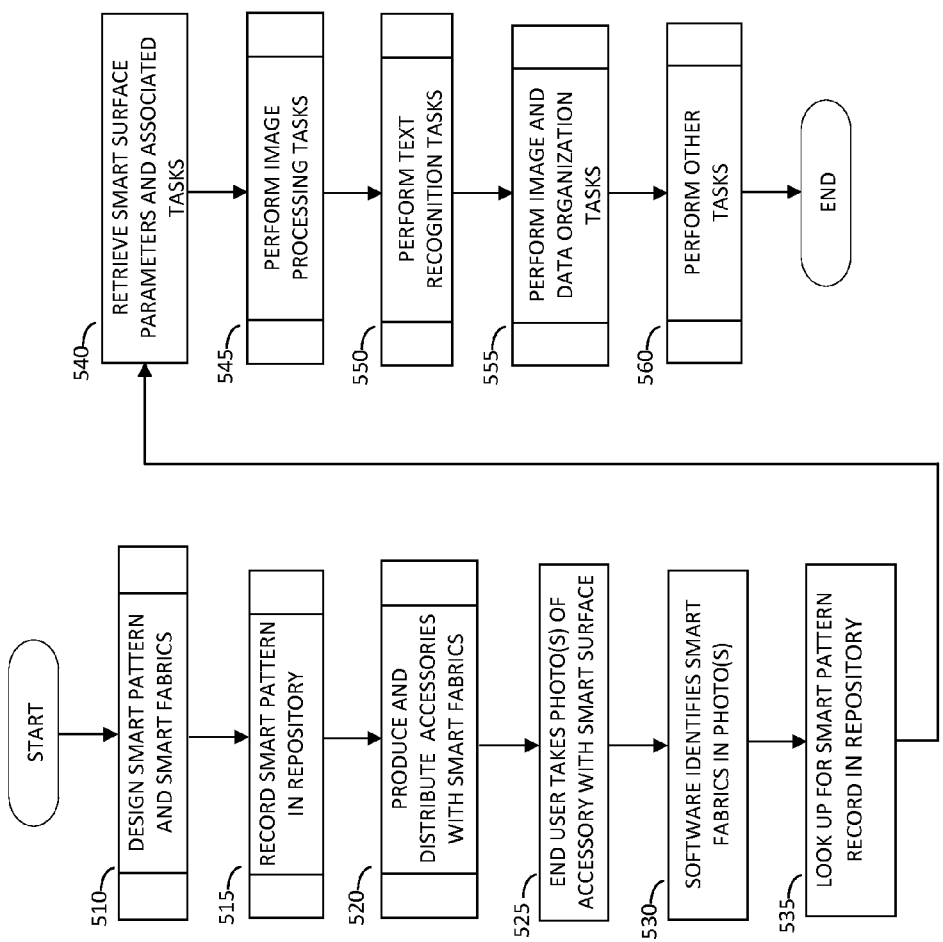
FIG. 5 is a system flow diagram illustrating processing in connection with design and usage of smart fabrics, according to an embodiment of the system described herein.

Referring to FIG. 5, a general system flow diagram 500 illustrates processing in connection with design and usage of smart fabrics according to the system described herein. Processing begins at a step 510 where smart patterns and smart fabrics are designed. Following the step 510 is a step 515 where the new smart patterns are recorded in the repository. Following the step 515 is a step 520 where accessories with smart fabrics are produced and distributed, as explained in more detail elsewhere herein. After the step 520, processing proceeds to a step 525 where an end user takes a photograph or multiple photographs of an accessory with a smart surface using a smartphone running smart pattern processing software. After the step 525, processing proceeds to a step 530 where the software identifies smart fabrics in the photograph(s) taken at the step 525. Note that identifying smart fabrics and the underlying smart pattern may be a multi-step and interactive activity, as explained elsewhere herein. After the step 530, processing proceeds to a step 535 where the software looks for a smart pattern record in the repository. After the step 535, processing proceeds to a step 540 where the software retrieves smart pattern parameters, together with associated tasks and instructions from the record. After the step 540, processing proceeds to a step 545 where the software performs image processing tasks, such as, for example, color and perspective correction, adjusting brightness and other filtering tasks. After the step 545, processing proceeds to a step 550 where the software optionally performs text recognition tasks, such as an OCR step during business card processing explained in conjunction with FIG. 1. After the step 550, processing proceeds to a step 555 where the software optionally performs image and data organization tasks, for example, filing notes created from the photographs into a personal content management system, as explained in conjunction with FIG. 2. After the step 555, processing proceeds to a step 560 where the software optionally performs other tasks associated with the smart fabrics. Following the step 560, processing is complete.

Figure 6:
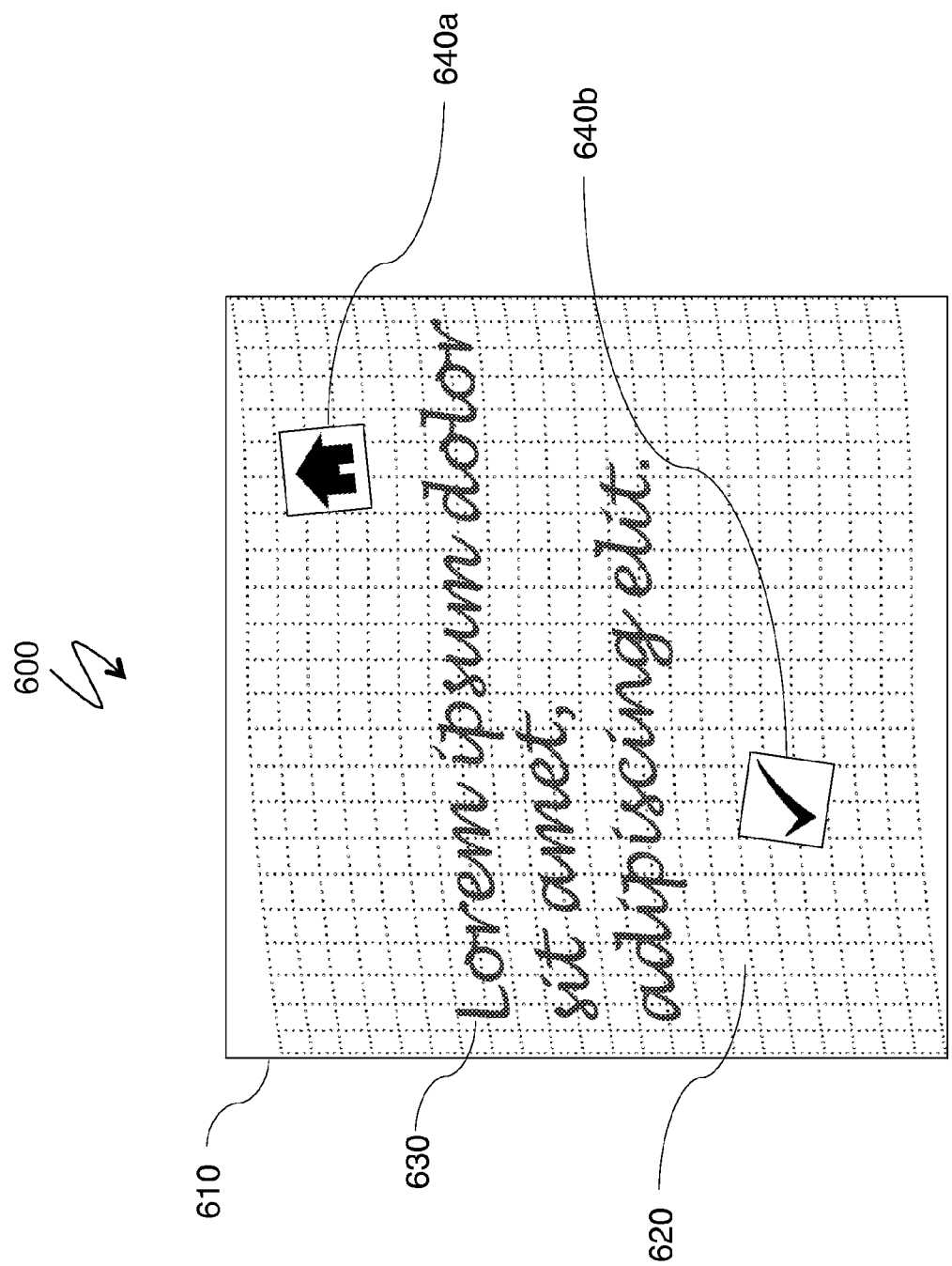
FIG. 6 is a schematic illustration of a photograph of a paper page with a simple pre-printed pattern, containing handwritten text and smart stickers, with grid distortion due to page flexure, according to an embodiment of the system described herein.

FIG. 6 is a schematic illustration 600 of a photograph 610 of a paper page with a simple pre-printed pattern, containing handwritten text 630 and smart stickers 640a, 640b, with grid distortion due to page flexure. The photograph 610 includes a curved grid 620, the handwritten text 630 and the stickers 640a, 640b. Geometrical page correction is accomplished by normalizing the grid through a non-linear transformation that eliminates curvature of the grid, as explained elsewhere herein. Functionality and usage of the smart stickers 640a, 640b is explained elsewhere herein.

Figure 7A:
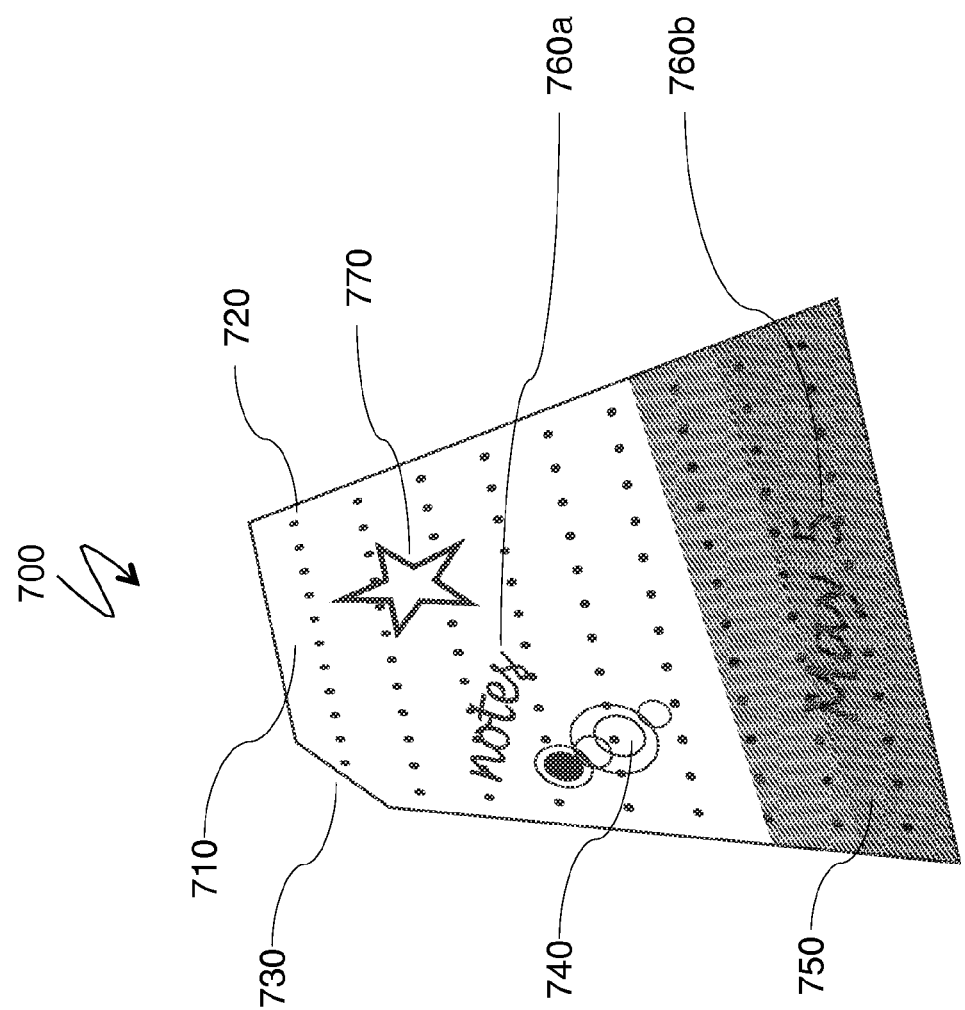

FIGS. 7A-7C illustrate several phases of correction of a photograph of a paper page with a simple pre-printed pattern. The photograph originally contains various types of defects and distortions.

FIG. 7A is an illustration 700 of an original photograph of a page 710 with a simple periodic pre-printed pattern 720, a folded, removed or obstructed corner 730, lens flare spots 740, a shadow 750 darkening toward the front (lower) edge of the paper, handwritten text 760a, 760b and a sticker 770. In this example, grid dimensions on the page are 12×9 dots with a uniform distance between horizontal and vertical lines of the grid and without grid deviations encoding additional parameters or identifiers. Not every line of the grid has a same visible number of dots: some of the dots may be absent or distorted because of the defects. Absent and/or distorted dots include a corner dot in a top line and a couple of dots interfering with handwritten letters or hidden due to the lens flare. Nevertheless, a few lines may have fully visible sets of dots which may be detected and, after comparing with distorted areas, may contribute to correct identification of the paper type, and therefore, of true grid dimensions. This allows for the preliminary identification of page boundaries and, after further calculations and processing, for perspective correction, as explained elsewhere herein. Knowing the paper type also facilitates adjusting brightness levels for the background, and subsequently eliminating the shadow 750 and the lens flare spots 740. Handwritten text may also be normalized, as explained in more details elsewhere herein, while the sticker 770 may be identified and processed or removed when the purpose of processing is restoring a high-quality handwritten note.

FIG. 7B is an illustration 790 of the page 710 after the page type has been identified, perspective correction performed, lens flare and sticker removed. A transformed page 755 has a grid 760 which in different embodiments may be either a corrected grid from the page 710 or an ideal grid superimposed over a cleaned up image, which includes, in addition to the grid, only handwritten notes 765a, 765b, which may have also undergone a perspective correction.

FIG. 7C is an illustration 795 of the transformed page 755 after an original or an artificial ideal grid has been removed and an additional binarization of the image has been performed. A page 775 has a white background 780 and handwritten note 785a, 785b written in black ink, which are most favorable condition for handwriting recognition and indexing of the notes 785a, 785b for future keyword search.

Figure 8B:
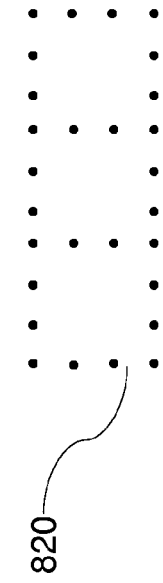
Figure 8A:
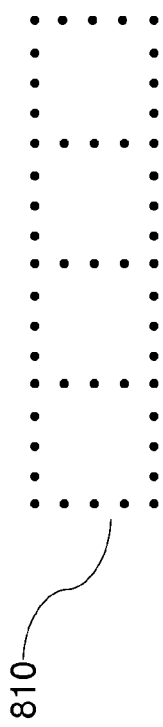
Figure 8D:
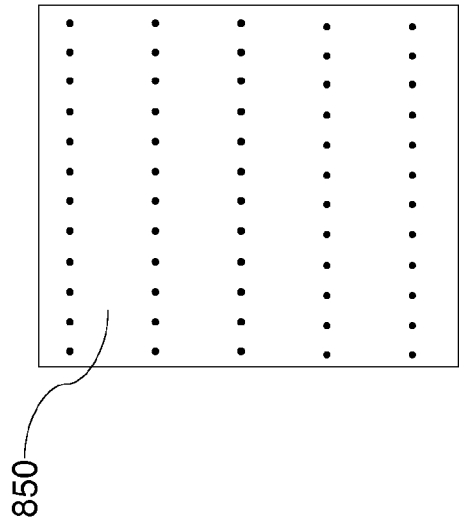
Figure 8C:
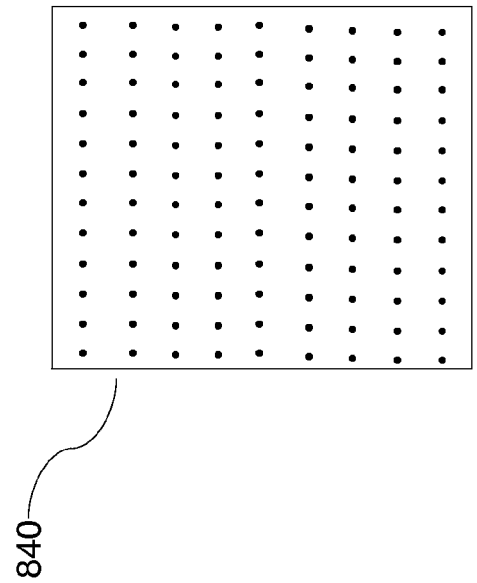

FIGS. 8A-8F illustrate different parameters of dotted pre-printed patterns on paper pages used to identify a pattern type. FIGS. 8A and 8B illustrate a cell-based design of a grid where different cell dimensions—5×5 dots in a pattern 810 and 4×4 dots in a pattern 820 may serve, possibly along with other parameters, as identifiers of a paper/pattern type. FIGS. 8C and 8D illustrate a paper type identification based on a number of lines and a distance between lines; in this example, horizontal lines have the same number of dots but the distance between the horizontal lines, and hence, numbers of dots in vertical lines are noticeably different between a first page 840 and a second 850. FIGS. 8E and 8F illustrate a type of paper/ pattern defined by a page layout. Thus, a page 870 has a uniform grid on the whole page, while a page 880 is split into three areas: top and bottom areas have two different grid parameters with the same number of dots per horizontal line but different distances between horizontal lines, while the middle area has no grid at all and has a solid thin rectangle boundary.

It should be noted that paper types exemplified on FIGS. 8A-8F may not be limited to a combination of grid and page layout. Each paper type may have a unique color and brightness values for the paper and the dots; furthermore, a corresponding smart pattern record, explained elsewhere herein, may include a designation of the paper and of different areas of a page (such as the page 880), may describe default configuration and options for smart stickers accompanying a paper notebook, etc.

Figure 9:
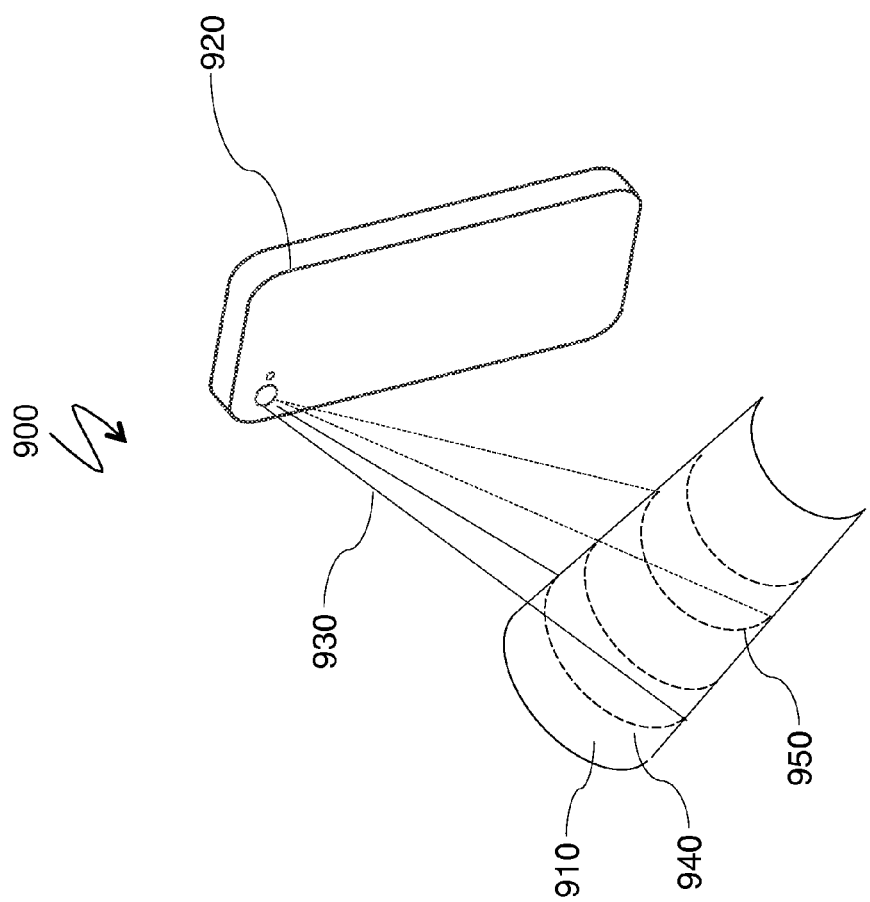
FIG. 9 is a schematic illustration of taking a photograph of a curved paper page having a simple pre-printed pattern, according to an embodiment of the system described herein.

FIG. 9 is a schematic illustration 900 of taking a photograph of a curved paper page with a simple pre-printed pattern. A paper page 910 with a simple pre-printed pattern is photographed using a smartphone 920 running page processing software, such as the Evernote Page Camera software. Depending on the view angle (schematically shown by dashed lines 930), gridlines may appear on the photo as more significantly curved lines, as in the case of a gridline 940 or as straight lines with variable distance between dots, as in the case of a gridline 950. The gridline 940 is characteristic for the higher view angles, while the gridline 950 reflects an area of the page 910 in straight view by the camera.

Figure 10:
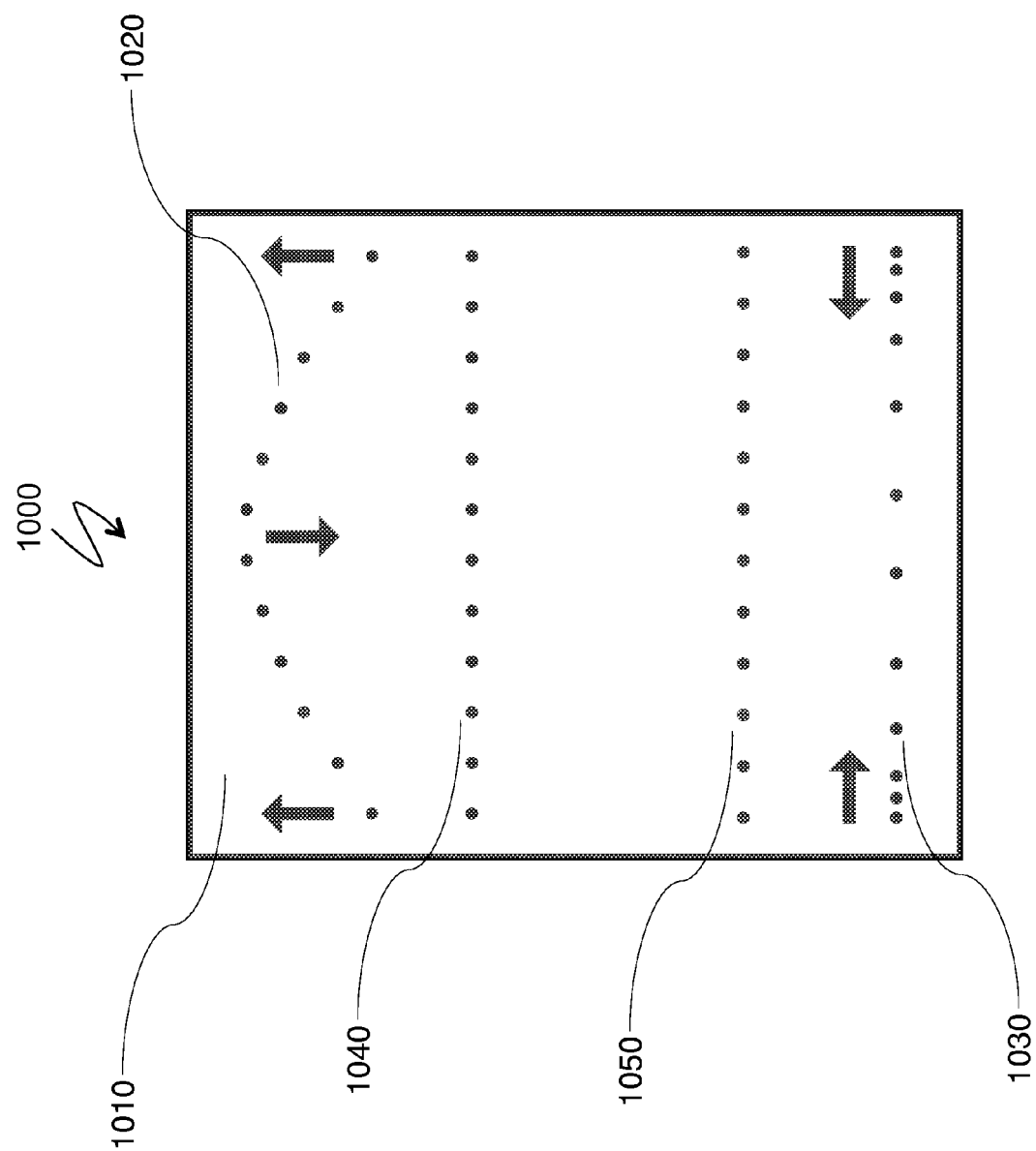
FIG. 10 is a schematic illustration of a page photograph transformation used during correction of a page curvature, according to an embodiment of the system described herein.

FIG. 10 is a schematic illustration 1000 of a page photograph transformation used to correct page curvature. A photograph 1010 includes gridlines with different curvature profiles and spatial distortions, such as a curved gridline 1020 viewed at a significant camera angle and a straight gridline 1030 with irregular intervals between dots caused by perspective distortion, as explained in conjunction with the FIG. 9. Based on known grid parameters and gridline depiction in the photograph, the software may build a non-linear page transformation to flatten the photograph to provide a non-distorted image. When the transformation is applied to the image, the transformation transforms the gridlines 1020, 1030 differently, straightening the gridline 1020 and changing the scale along the gridline 1030, which should result in practically congruent gridlines 1040, 1050. Other portions of the photograph 1010, such as a handwritten note or a sticker depicted on the photograph, may be transformed accordingly.

Figure 11:
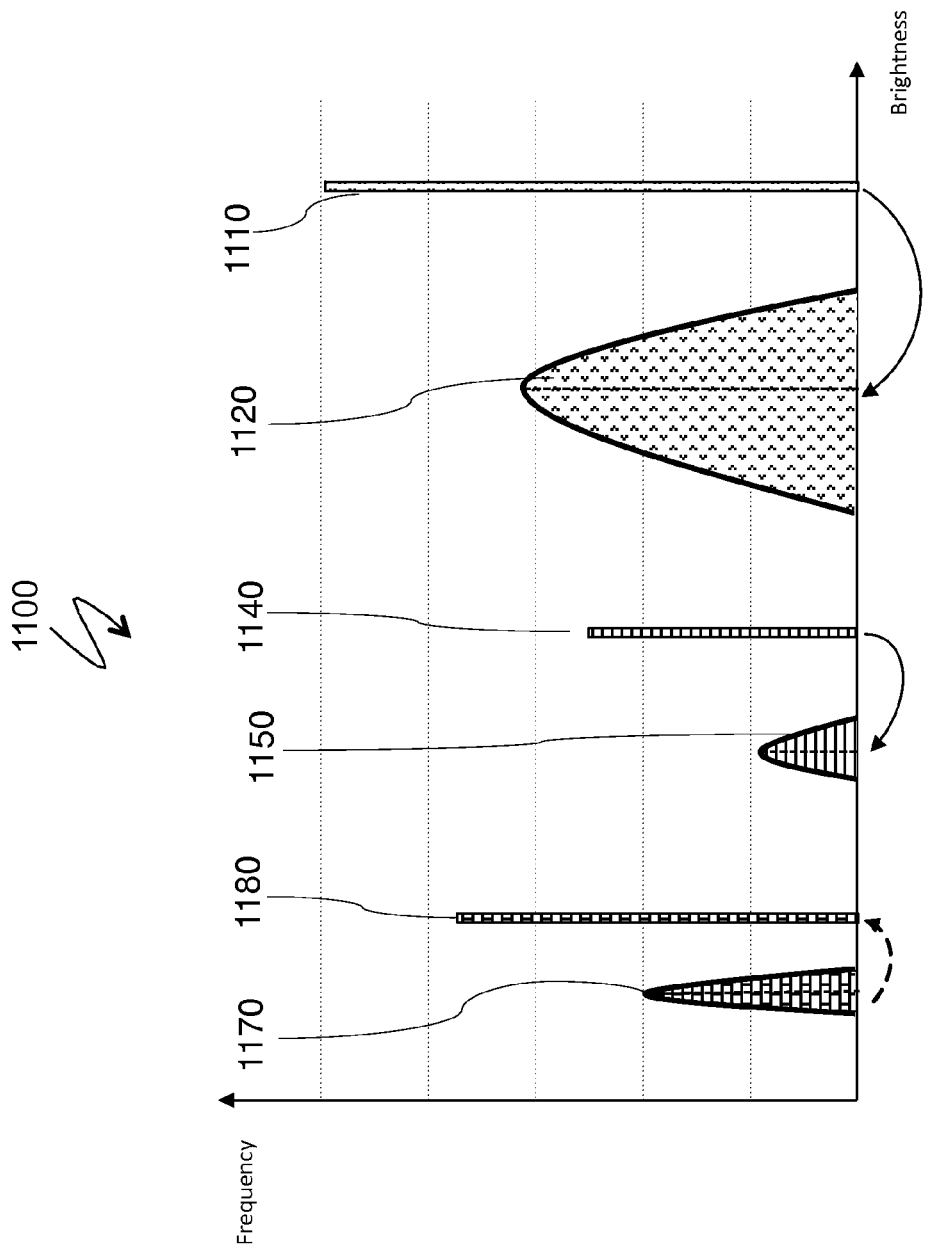
FIG. 11 is a schematic illustration of a method of brightness correction for handwriting on a page with simple pre-printed pattern based on known brightness characteristics of a paper and dots on the paper, according to an embodiment of the system described herein.

FIG. 11 is a schematic illustration 1100 of a method of brightness correction for handwriting on a page with a simple pre-printed pattern based on known brightness characteristics of a paper and dots. A graph may include built in assumptions that: (a) paper type has been identified using methods explained elsewhere herein; and (b) under ideal conditions, the paper is brighter than the dots of the pre-printed pattern and the ink is user handwriting that is darker than the dots. Note that the dots shown in the pre-printed patterns of FIGS. 6-10, 12, 14 may be any color, such as gray with a brightness that may be carefully chosen so that, while still bright enough to be clearly visible to a user under normal and even slightly worsened lighting conditions, the dots do not interfere with handwritten strokes for a majority of ballpoint and fountain pens and for commonly accepted ink brands and colors for note-taking Nevertheless, non-uniform lighting conditions, different flash modes, shadows, lens flares and other defects may distort a photograph and cause significant dispersion of brightness values for each of the page elements across the image. This may be addressed by brightness correction to avoid losing information on the page.

The brightness/frequency graphs in the illustration 1100 show distributions of the ideal and actual brightness values for three page elements—paper (marked by a subscript "p"), dots of the grid pattern (subscript "d"), and ink strokes in user handwriting (subscript "i"). An ideal distribution curve of a paper brightness value 1110 may be contrasted by an actual distribution of paper brightness values on a curve 1120. Similarly, brightness values of dots are represented by an ideal distribution curve 1140 and an actual distribution curve 1150; lower frequency amplitudes correspond to a relatively rare occurrence of dots. Since the paper type has been presumably identified (see assumption (a) above), both ideal values for the paper and the dot brightness are known from the smart pattern record and may be used in calculations. On the other hand, true brightness value of the ink in user handwriting illustrated by the distribution curve 1180 is unknown and has to be restored through calculations from the actual brightness values on the image represented by the distribution curve 1170.

In many practical applications, it may be expected that actual brightness values are shifted to the left compared with ideal values, i.e. that each of the elements of the image: paper, dots, and ink, is darker on an image taken under average lighting conditions than the same image would be under the ideal lighting conditions. Furthermore, it is known from empiric and theoretical studies that the transformation function between ideal brightness values and average (or median) actual values may be monotonic but non-linear. Both parameters of a two-parametric sigmoid function $b^{ph}=S(b_p^{std})$ for the ideal-to-actual brightness transformation function may be defined from two equations:

$$b_p^{ph}=S(b_p^{std}) \qquad \text{Eq. 1:}$$

and $$b_d^{ph}=S(b_d^{std}) \qquad \text{Eq. 2:}$$

by substituting $b^{std}$ with the ideal values and $b^{ph}$ with the average actual values for paper (Eq. 1) and dots (Eq. 2) respectively. A superscript std above the brightness value denoted b stands for the standard (i.e. the ideal value) and a superscript ph for the photo (actual value). Thus, the transformation function from ideal to actual values is defined and the inverse function $S^{-1}$ is used to restore the ideal brightness value for the ink in user handwriting: $b_i^{std}=S^{-1}(b_i^{ph})$. A subsequent image processing may include replacing the actual brightness values for paper, dots and ink (intervals under three bell-shaped curves 1120, 1150, 1170) with ideal values 1110, 1140, 1180, thus improving the photograph and eliminating effects of non-uniform lighting, undesirable shadows and other defects.

Figure 12:
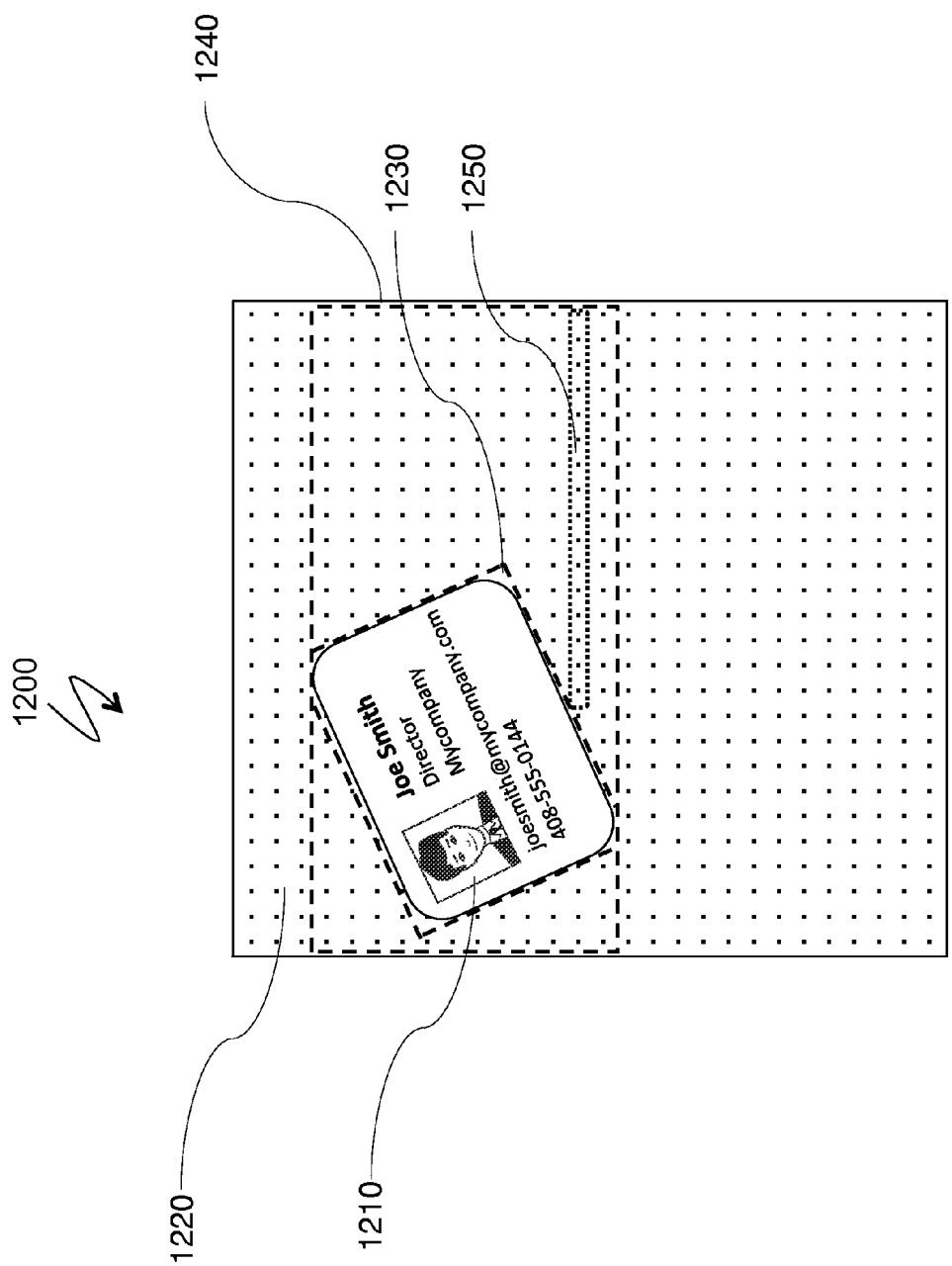
FIG. 12 is a schematic illustration of identification of object boundaries on a page with a simple pre-printed pattern, exemplified by a business card, according to an embodiment of the system described herein.

FIG. 12 is a schematic illustration 1200 of identification of object boundaries on a page with a simple pre-printed pattern, exemplified by a business card. The illustration 1200 is similar to the use of smart fabrics explained in conjunction with FIG. 1, as described elsewhere herein. When a business card is photographed on a random regular surface, such as an office desk or a table, the boundaries of the business card may blend with the surface and random reflections from the surface may further worsen image quality and complicate processing. On the other hand, when a business card 1210 is photographed on a page with a dotted grid pattern 1220, a bounding rectangle 1230 of the business card 1210 may be easily restored from a larger coordinate rectangle 1240 (the smallest coordinate rectangle that includes the whole card) by calculating the number of dots from edges of the page to the card in each horizontal (or vertical) gridline partially covered by the card, as illustrated by a partial line 1250. Furthermore, the position of the bounding rectangle 1240 with respect to the grid immediately defines rotation angle, and brightness values of the paper and dots may be used for color correction and binarization of the card image, which improves subsequent parsing and OCR steps. Geometrical restoration of the card in such conditions may be easier than for a generic smart surface such as the surface illustrated in connection with FIG. 1. An advantage of the smart fabrics of FIG. 1 is an automatic task assignment, so that a business card is instantly and automatically processed based on the smart pattern record, whereas the workflow associated with the surface shown in FIG. 12 may assume additional interactions of the software with a user who may order specific processing of a restored object as a business card.

Figure 13:
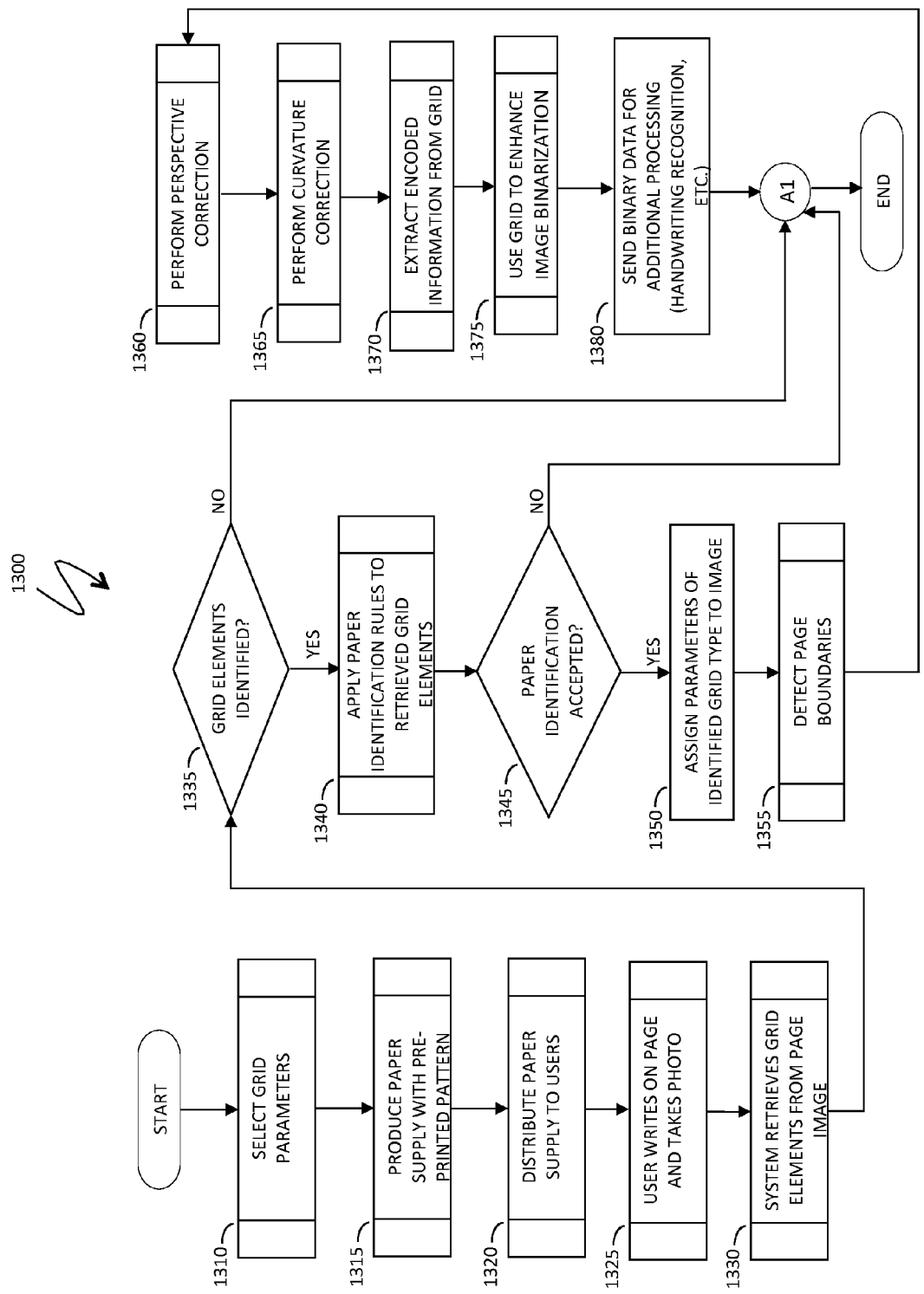
FIG. 13 is a flow diagram showing creating a paper with a simple pre-printed pattern, and identifying and processing photographs of pages, according to an embodiment of the system described herein.

Referring to FIG. 13, a system flow diagram 1300 illustrates processing in connection with creation of a paper with a simple pre-printed pattern, and with identifying and processing photographs of its pages, explained in more details elsewhere herein. Processing begins at a step 1310 where grid parameters are selected by designers, developers and production teams. Following the step 1310 is a step 1315 where paper supply with pre-printed pattern is produced; the paper may be in the form of notebooks such as Evernote Smart Notebooks by Moleskine, or may be paper pads, for example, special designs of Post-it® notepads, etc. After the step 1315, processing proceeds to a step 1320 where the paper supply is distributed to end users. After the step 1320, processing proceeds to a step 1325 where a user makes a handwritten note and takes a photograph of the note with a smartphone running special image processing software, such as Evernote Page Camera software.

After the step 1325, processing proceeds to a step 1330 where the system attempts to retrieve grid elements, such as dots, on a page image corresponding to the photograph. After the step 1330, processing proceeds to a test step 1335 where it is determined whether grid elements have been identified (i.e., detected). If not, then processing is complete; otherwise, processing proceeds to a step 1340 where paper identification rules (decision rules explained in details elsewhere herein) are applied to retrieved grid elements to identify paper type. After the step 1340, processing proceeds to a test step 1345 where it is determined whether the paper identification is accepted by the system. If not, processing is complete; otherwise, processing proceeds to a step 1350 where the parameters of an identified pattern (paper/grid type) are assigned to the image for further use in image processing. After the step 1350, processing proceeds to a step 1355 where page boundaries are detected. After the step 1355, processing proceeds to a step 1360 where a perspective correction is performed. The steps 1355, 1360 are explained in more detail elsewhere herein, in particular, in conjunction with FIG. 7A.

After the step 1360, processing proceeds to a step 1365 where page curvature on the photograph is optionally corrected, as explained in more detail elsewhere herein (see, for example, FIGS. 9, 10 and the corresponding description). After the step 1365, processing proceeds to a step 1370 where custom page information encoded by deviations of grid patters may be optionally extracted from the grid. After the step 1370, processing proceeds to a step 1375 where image binarization is enhanced based on information extracted from the grid pattern, as explained in more details elsewhere herein, in particular, in conjunction with the brightness adjustment discussion for the FIG. 11. After the step 1375, processing proceeds to a step 1380 where binary black-and-white data are sent for additional processing, such as handwriting recognition that may occur on the servers of a content management system, such as the Evernote Service. Following the step 1380, processing is complete.

Figure 14:
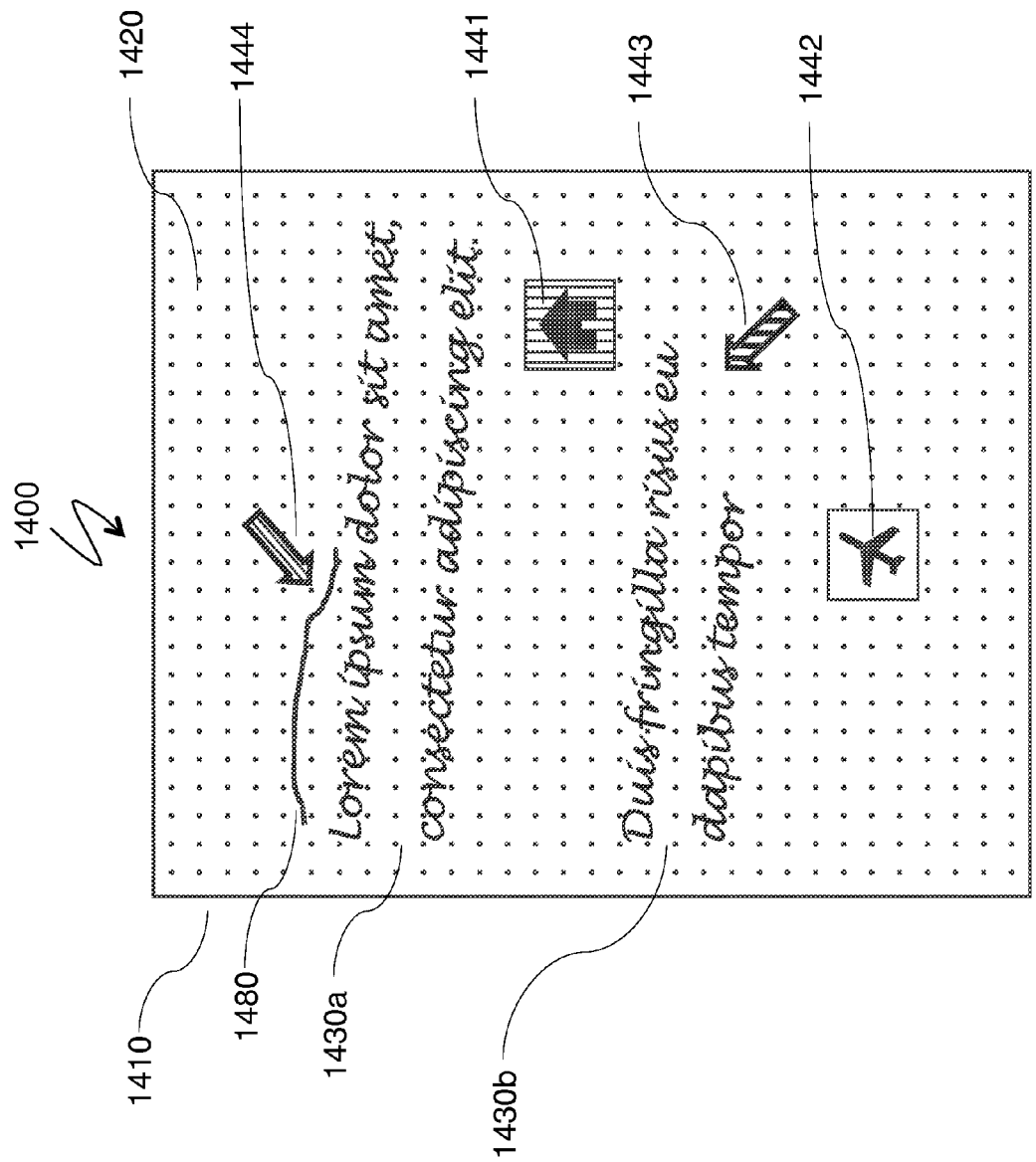
FIG. 14 is a schematic illustration of a handwritten page with a simple pre-printed pattern and with smart stickers, according to an embodiment of the system described herein.

FIG. 14 is a schematic illustration 1400 of a handwritten page with a simple pre-printed pattern and with several affixed smart stickers performing different functions. A page 1410 with a pre-printed simple pattern 1420 and handwritten notes 1430a, 1430b has four smart stickers 1441-1444 affixed to the page 1410. The stickers 1441-1444 are recognized by the smart pattern processing software on the page photograph. The stickers 1441-1444 may be generic smart stickers recognized on any smart surface or specialized stickers recognized on one or several paper/grid types and included in smart pattern record(s) for such type(s). Different filling patterns for the stickers 1441-1444 on the illustration 1400 may denote different colors. A sticker set available for a particular paper/grid type may have limited number of different smart sticker categories with contrasting colors, so that the sticker color alone may be used for identification. Alternatively, sticker shapes (such as the arrow stickers 1443, 1444 and the square stickers 1441, 1442 shown on the page 1410) and/or pre-printed images on stickers (such as the house sticker 1441 and the plane sticker 1442 shown on the page 1410) may be used as additional identifying characteristics. A smart sticker may also have a simple pre-printed smart pattern on a surface of the smart sticker to facilitate its identification.

Two smart stickers 1441, 1442 carry filing and tagging instructions. The stickers 1441, 1442 may have different tags and/or content collections (such as Evernote notebooks) associated with the stickers 1441, 1442. A handwritten note created from one or multiple page photographs may be filed to collection(s) and assigned tag(s) identified by the stickers. Default notebooks and tags associated with the stickers may correspond to the depictions of the stickers: for example, the sticker 1441 may be associated with a tag labeled "Home" and the sticker 1442 may be associated with a tag labeled "Travel". Stickers may also cause filing of corresponding images into one or more default notebooks designated by a user. Both the notebooks and the tags for each smart sticker may be customized in using one or more smart sticker software settings.

The sticker 1443 represents another type of action associated with a sticker—a custom tag not known to a user at the time of taking a handwritten note in a paper notebook and affixing stickers to the page. At the time of filing a note into a content collection, the software may remind the user about a custom tag the user intends to assign to a corresponding note and the user may add another tag or cancel an activity associated with the sticker.

The arrow sticker 1444 illustrates a different kind of activity; the arrow sticker 1444 is a contextual and positional sticker that is employed by a user to point to a marked up portion of a handwritten text on a page and to instruct the software to make indicated text, after handwriting recognition, a note title. The software identifies a markup line 1480, detects a portion of handwritten text associated with the markup line 1480, and puts the recognized text into the note title prior to filing the note. Different options assigning a title may be available to the user: for example, the title may be filled with the text only if handwriting recognition had a sufficiently high confidence level; otherwise, a generic text may be put as a note title and the title fragment of handwritten text may be included on top of the note as a sub-title.

Figure 15A:
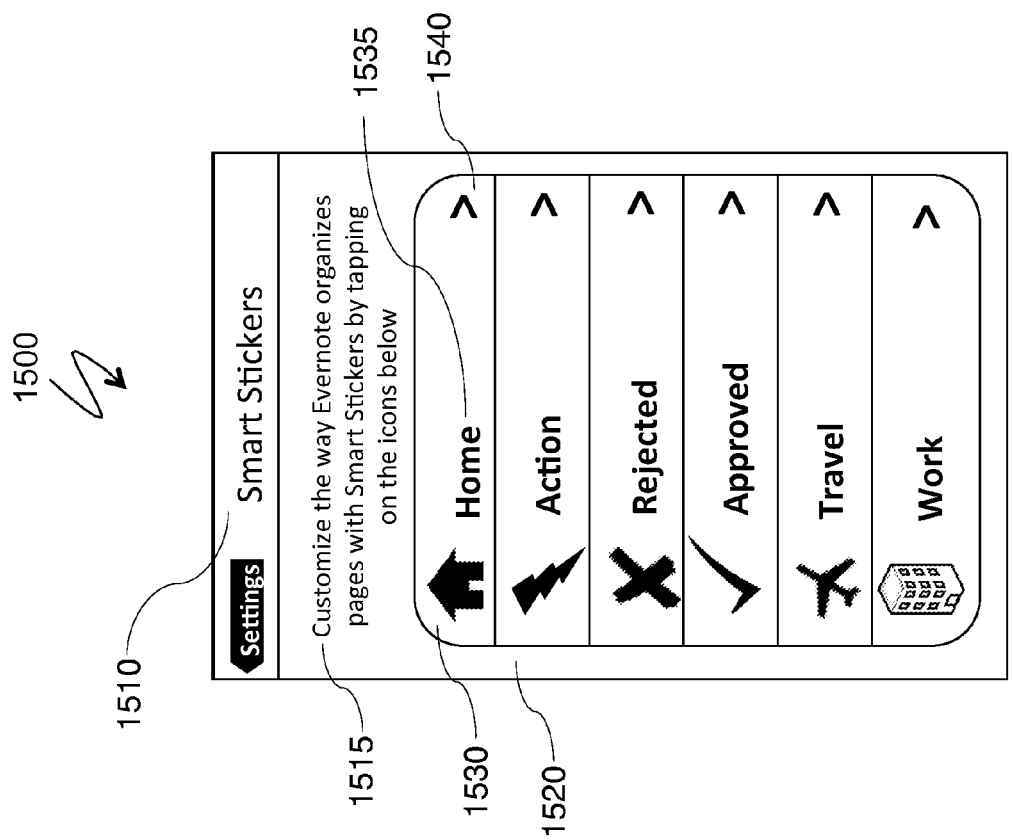
FIGS. 15A-15B are schematic illustrations of system settings associated with customizing parameters and actions for smart stickers, according to an embodiment of the system described herein.
Figure 15B:
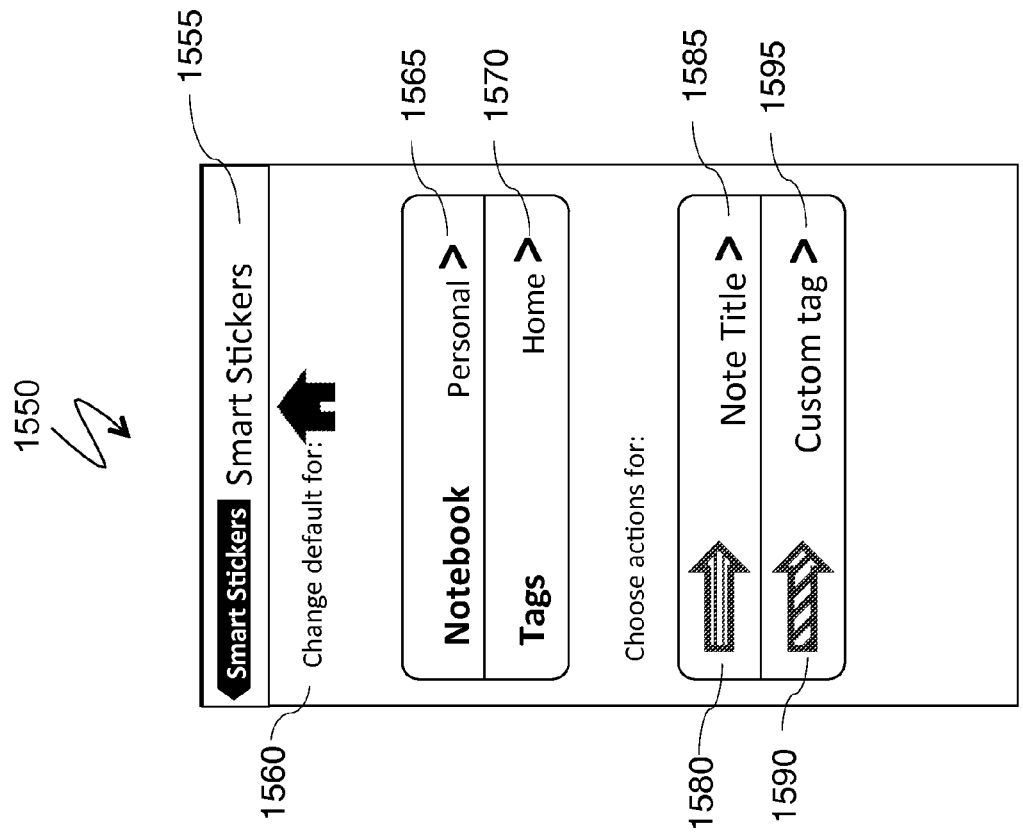

FIGS. 15A-15B are schematic illustrations of system settings associated with customizing parameters and actions for smart stickers, as explained in conjunction with the FIG. 14.

FIG. 15A is a schematic illustration 1500 of a general settings pane for smart stickers. The pane 1510 contains a general description 1515 and a scrollable sticker list 1520 where each smart sticker has a slot with a sticker icon 1530, a current tag assignment 1535 and a link to sticker settings details 1540.

FIG. 15B is a schematic illustration 1550 of a smart sticker settings details pane. The pane 1555 contains two portions. The first portion is a top part that sets up filing and tagging parameters for a labeling sticker chosen from the list 1520. In the example of FIG. 15B, the first sticker, labeled "Home", has been chosen. Accordingly, a corresponding header 1560 contains an icon of a selected smart sticker. A notebook designation pane 1565 shows a current notebook (content collection) name, labeled "Personal". After a user clicks an arrow in the pane 1565, the software may display a selectable list of all notebooks available to the user. Similarly, a tag designation pane 1570 allows associating with the smart sticker any of the tags already defined by the user. Optionally, new notebooks and tags may be created within the same user interface. A bottom part of the details pane lets a user assign actions to two arrow stickers 1580, 1590. Current actions, the action 1585—assigning Note Title (using a marked up portion of the handwritten text) and the action 1595—assigning an additional custom tag to a note (unknown at the moment of adding the smart sticker to the page) are indicated in the pane and may be changed to other actions after using action menus attached to the arrows at the right side of action definition slots.

Figure 16:
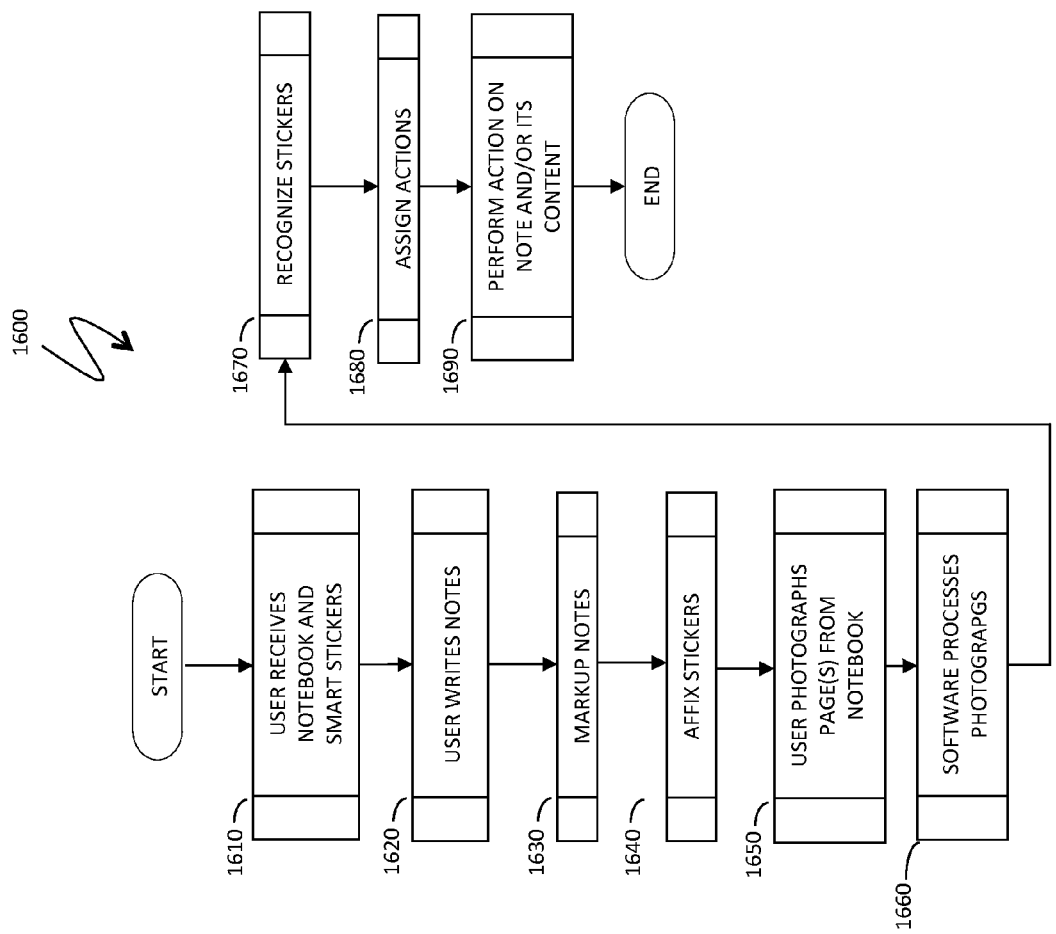
FIG. 16 is a flow diagram showing system processing for smart stickers, according to an embodiment of the system described herein.

Referring to FIG. 16, a flow diagram 1600 shows system processing related to smart stickers. Processing begins at a step 1610 where a user receives a paper notebook (or other accessories with smart fabrics) and a set of smart stickers. Following the step 1610 is a step 1620 where the user writes in the paper notebook. Following the step 1620 is a step 1630 where the user marks up handwritten notes to indicate anchors for smart stickers. Note that the step 1620 may be optional for certain applications of smart stickers to smart surfaces and the step 1630 may be optional and depend on the sticker set and the associated actions, as explained in more detail elsewhere herein (see, for example, FIGS. 14, 15 and corresponding text).

After the step 1630, processing proceeds to a step 1640 where the user affixes smart stickers to notebook page(s) or other surfaces. After the step 1640, processing proceeds to a step 1650 where a user takes photograph(s) of page(s) from the notebook or of other smart surfaces with affixed stickers. After the step 1650, processing proceeds to a step 1660 where smart pattern management software processes the photographs. After the step 1660, processing proceeds to a step 1670 where smart stickers are recognized. After the step 1670, processing proceeds to a step 1680 where actions are assigned to stickers according to current system settings and parameters, as explained in more detail elsewhere herein (see, for example, FIGS. 15A and 15B and the corresponding text). After the step 1680, processing proceeds to a step 1690 where the system performs assigned actions on photographs, handwritten notes and/or content of the handwritten notes, as explained in more detail elsewhere herein (see, for example, FIGS. 14, 15A, and 15B and the corresponding text). Following the step 1690, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions. The mobile device may be a cell phone, although other devices are also possible.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A computer-implemented method for a user to perform a particular action on data for a photographic image, comprising:
   a user handwriting notes on paper;
   the user affixing at least one sticker on the paper;
   the user photographing the paper to generate the data for a photographic image;
   a processor performing the steps of:
   detecting a reference pattern in the data, wherein the reference pattern is pre-printed on the paper and provides parameters for correction of the photographic image and wherein a paper type is determined according to the reference pattern;
   detecting at least one sticker in the data;
   selecting the particular action from a plurality of possible actions based on the at least one sticker and on the paper type; and
   performing the particular action on the data.

2. A computer-implemented method, according to claim 1, wherein the reference pattern is a uniform grid pattern of dots preprinted on the paper.

3. A computer-implemented method, according to claim 1, wherein detecting a particular one of the stickers causes data for the photographic image to be stored in a particular location.

4. A computer-implemented method, according to claim 1, wherein detecting a particular one of the stickers causes data for the photographic images to be assigned particular tags used for organizing and searching.

5. A computer-implemented method, according to claim 1, wherein a particular one of the stickers represents a custom tag that is assigned after data for the photographic image is stored.

6. A computer-implemented method, according to claim 1, wherein detecting a particular one of the stickers causes handwritten text corresponding to the sticker to be used for a title of a note corresponding to the data for the photographic image.

7. Computer software, provided in a non-transitory computer-readable medium, that handles data for a photographic image, the software comprising:
    executable code that detects a reference pattern in the data, wherein the reference pattern is pre-printed on the paper and provides parameters for correction of the photographic image and wherein the data is provided by a photograph taken by a user of a handwritten note of the user on which the user had affixed a sticker;
    executable code that determines a paper type according to the reference pattern;
    executable code that detects the at least one sticker in the data;
    executable code that determines an action associated with based on the at least one sticker and on the paper type; and
    executable code that performs the action on the data.

8. Computer software, according to claim 7, wherein the reference pattern is a uniform grid pattern of dots preprinted on the paper.

9. Computer software, according to claim 7, wherein detecting a particular one of the stickers causes data for the photographic image to be stored in a particular location.

10. Computer software, according to claim 7, wherein detecting a particular one of the stickers causes data for the photographic images to be assigned particular tags used for organizing and searching.

11. Computer software, according to claim 7, wherein a particular one of the stickers represents a custom tag that is assigned after data for the photographic image is stored.

12. Computer software, according to claim 7, wherein detecting a particular one of the stickers causes handwritten text corresponding to the sticker to be used for a title of a note corresponding to the data for the photographic image.

13. Computer software, according to claim 7, wherein the software is one of: pre-loaded with a device, installed from an application store, and downloaded from a location of a network operator.

14. A computer-implemented method, according to claim 1, wherein the parameters for correction of the photographic image estimate camera view angle to provide perspective correction.

15. A computer-implemented method, according to claim 1, wherein the parameters for correction of the photographic image are used to estimate a distribution of distances between dots of a uniform grid pattern of dots along a single line augmented by calculating gridline curvature to correct for curved edges of the image.

16. Computer software, according to claim 7, wherein the parameters for correction of the photographic image estimate camera view angle to provide perspective correction.

17. Computer software, according to claim 7, wherein the parameters for correction of the photographic image are used to estimate a distribution of distances between dots of a uniform grid pattern of dots along a single line augmented by calculating gridline curvature to correct for curved edges of the image.

* * * * *